United States Patent
Chang et al.

(10) Patent No.: US 9,971,176 B2
(45) Date of Patent: May 15, 2018

(54) LIQUID CRYSTAL DISPLAY PANEL AND DRIVING METHOD THEREOF

(71) Applicant: AU OPTRONICS CORPORATION, Hsin-chu (TW)

(72) Inventors: Wan-Heng Chang, Hsin-chu (TW); Chen-Feng Fan, Hsin-chu (TW); Sung-Yu Su, Hsin-chu (TW); Hsiao-Wei Cheng, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days. days.

(21) Appl. No.: 15/275,634

(22) Filed: Sep. 26, 2016

(65) Prior Publication Data

US 2017/0255041 A1 Sep. 7, 2017

(30) Foreign Application Priority Data

Mar. 7, 2016 (TW) .............................. 105106897 A

(51) Int. Cl.
*G02F 1/13* (2006.01)
*G02F 1/133* (2006.01)
(Continued)

(52) U.S. Cl.
CPC ........ *G02F 1/1323* (2013.01); *G02F 1/13306* (2013.01); *G02F 1/13439* (2013.01);
(Continued)

(58) Field of Classification Search
CPC ........... G02F 1/134336; G02F 1/13439; G02F 1/133514; G02F 1/133512; G02F 1/13306;
(Continued)

(56) References Cited

U.S. PATENT DOCUMENTS 9,058,782 B2 6/2015 Fan et al.
2004/0090576 A1* 5/2004 Chuang ............. G02F 1/133555
349/114
(Continued)

FOREIGN PATENT DOCUMENTS

TW 200725541 A 7/2007

OTHER PUBLICATIONS

Office Action issued by (TIPO) Intellectual Property Office, Ministry of Economic Affairs, R. O. C. dated Sep. 19, 2016 for Application No. 105106897, Taiwan.

*Primary Examiner* — Shaheda Abdin
(74) *Attorney, Agent, or Firm* — Tim Tingkang Xia, Esq.; Locke Lord LLP

(57) ABSTRACT

A liquid crystal display panel includes first and second substrates, first pixel electrodes, second pixel electrodes, common electrodes, first auxiliary electrodes, and a liquid crystal layer. The second substrate is disposed opposite to the first substrate. The liquid crystal layer is disposed between the first and the second substrates. The first pixel electrodes, the second pixel electrodes, and the common electrodes are disposed on the first substrate. The first auxiliary electrodes are disposed on the second substrate. One of the first pixel electrodes is not overlapping one of the first auxiliary electrodes in a vertical projection direction. A driving method of the liquid crystal display panel includes setting a first voltage difference in a wide viewing mode and a second voltage difference in a narrow viewing mode between the first auxiliary electrodes and the common electrodes and, respectively. The first voltage difference is less than the second voltage difference.

18 Claims, 25 Drawing Sheets

(51) Int. Cl.
  *G02F 1/1335* (2006.01)
  *G02F 1/1343* (2006.01)
  *G06F 3/041* (2006.01)
  *G09G 3/36* (2006.01)
  *G02F 1/1333* (2006.01)
  *G02F 1/1362* (2006.01)
  *G02F 1/1368* (2006.01)

(52) U.S. Cl.
  CPC .. *G02F 1/133512* (2013.01); *G02F 1/133514* (2013.01); *G02F 1/134309* (2013.01); *G02F 1/134336* (2013.01); *G06F 3/0412* (2013.01); *G06F 3/0414* (2013.01); *G06F 3/0416* (2013.01); *G09G 3/3614* (2013.01); *G02F 1/1368* (2013.01); *G02F 1/13338* (2013.01); *G02F 1/136286* (2013.01); *G02F 2001/134381* (2013.01); *G02F 2201/121* (2013.01); *G02F 2201/123* (2013.01); *G02F 2201/52* (2013.01); *G09G 2320/066* (2013.01)

(58) Field of Classification Search
  CPC .. G02F 1/13338; G09G 3/3614; G06F 3/0412
  See application file for complete search history.

(56) References Cited

U.S. PATENT DOCUMENTS

| | | | |
|---|---|---|---|
| 2006/0215081 A1 | 9/2006 | Song et al. | |
| 2006/0244741 A1* | 11/2006 | Kimura | G02F 1/13452 345/204 |
| 2007/0152932 A1 | 7/2007 | Chung et al. | |

* cited by examiner

LIQUID CRYSTAL DISPLAY PANEL AND DRIVING METHOD THEREOF

CROSS-REFERENCE TO RELATED APPLICATION

This non-provisional application claims priority to and benefit of, under 35 U.S.C. § 119(a), Patent Application No. 105106897 filed in Taiwan R.O.C. on Mar. 7, 2016, the entire content of which is hereby incorporated by reference.

TECHNICAL FIELD

The present disclosure relates to a liquid crystal display panel and a driving method thereof, and more particularly to a liquid crystal display panel switchable between a wide viewing angle mode and a narrow viewing angle mode and a driving method thereof.

BACKGROUND

Generally, in order to provide an image viewed by many people simultaneously, a display commonly has a wide viewing angle display effect. However, in some cases, for example, when displaying confidential information or entering passwords, the confidential information may leak because it can easily be peeped by others due to the wide viewing angle display effect. Thus, in order to satisfy the two different requirements, an adjustable viewing angle display switchable between a wide viewing angle display mode and a narrow viewing angle display mode is becoming an important commodity in the display market.

Currently, privacy measures for a display are generally as follows: a privacy filter is directly mounted onto the display along with additional viewing angle control module unit(s). However, all of these methods cannot incorporate privacy measures into a display panel.

SUMMARY OF THE INVENTION

The main objective of the present invention is to provide a liquid crystal display panel and a driving method thereof, where first auxiliary electrodes are not overlapping first pixel electrodes, thereby increasing a front-viewing-angle transmittance in a narrow viewing angle mode and increasing a display contrast.

In order to achieve the above objective, one of the embodiments of the present invention provides a liquid crystal display panel, comprising a first substrate, a second substrate, a plurality of first pixel electrodes, a plurality of second pixel electrodes, a plurality of common electrodes, a plurality of first auxiliary electrodes, and a liquid crystal layer. The second substrate is disposed opposite to the first substrate, and the liquid crystal layer is disposed between the first substrate and the second substrate. The first pixel electrodes, the second pixel electrodes, and the common electrodes are disposed on the first substrate. The first auxiliary electrodes are disposed on the second substrate, and one of the first pixel electrodes is not overlapping one of the first auxiliary electrodes in a vertical projection direction.

In order to achieve the above objective, one of the embodiments of the present invention provides a driving method of a liquid crystal display panel, the driving method comprising: first providing a liquid crystal display panel, wherein the liquid crystal display panel comprises a first substrate, a second substrate, a plurality of first pixel electrodes, a plurality of second pixel electrodes, a plurality of common electrodes, a plurality of first auxiliary electrodes, and a liquid crystal layer, wherein the second substrate is disposed opposite to the first substrate, and the liquid crystal layer is disposed between the first substrate and the second substrate; the first pixel electrodes, the second pixel electrodes, and the common electrodes are disposed on the first substrate; the first auxiliary electrodes are disposed on the second substrate, and one of the first pixel electrodes is not overlapping one of the first auxiliary electrodes in a vertical projection direction; in a wide viewing angle mode, providing a first voltage difference between the first auxiliary electrodes and the common electrodes; and in a narrow viewing angle mode, providing a second voltage difference between the first auxiliary electrodes and the common electrodes, wherein the first voltage difference is less than the second voltage difference.

BRIEF DESCRIPTIONS OF THE DRAWINGS

DETAILED DESCRIPTION OF THE EMBODIMENTS

In order to allow a person of ordinary skill in the art to further understand the features and technical content of the present disclosure, reference can be made to the detailed description and accompanying drawings of the present disclosure.

Figure 1:
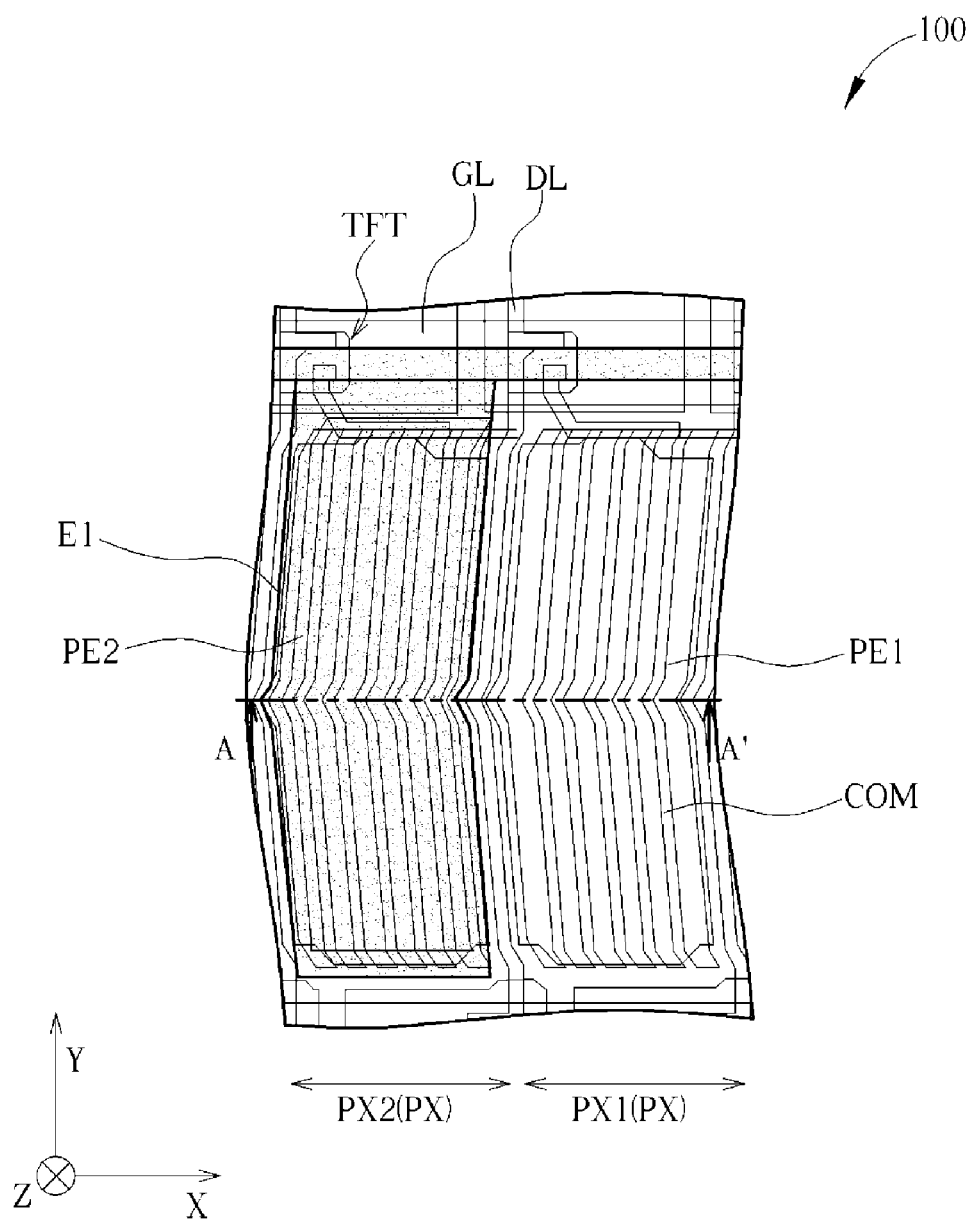
FIG. 1 is a schematic viewing of a liquid crystal display panel of a first embodiment of the present invention.
Figure 2:
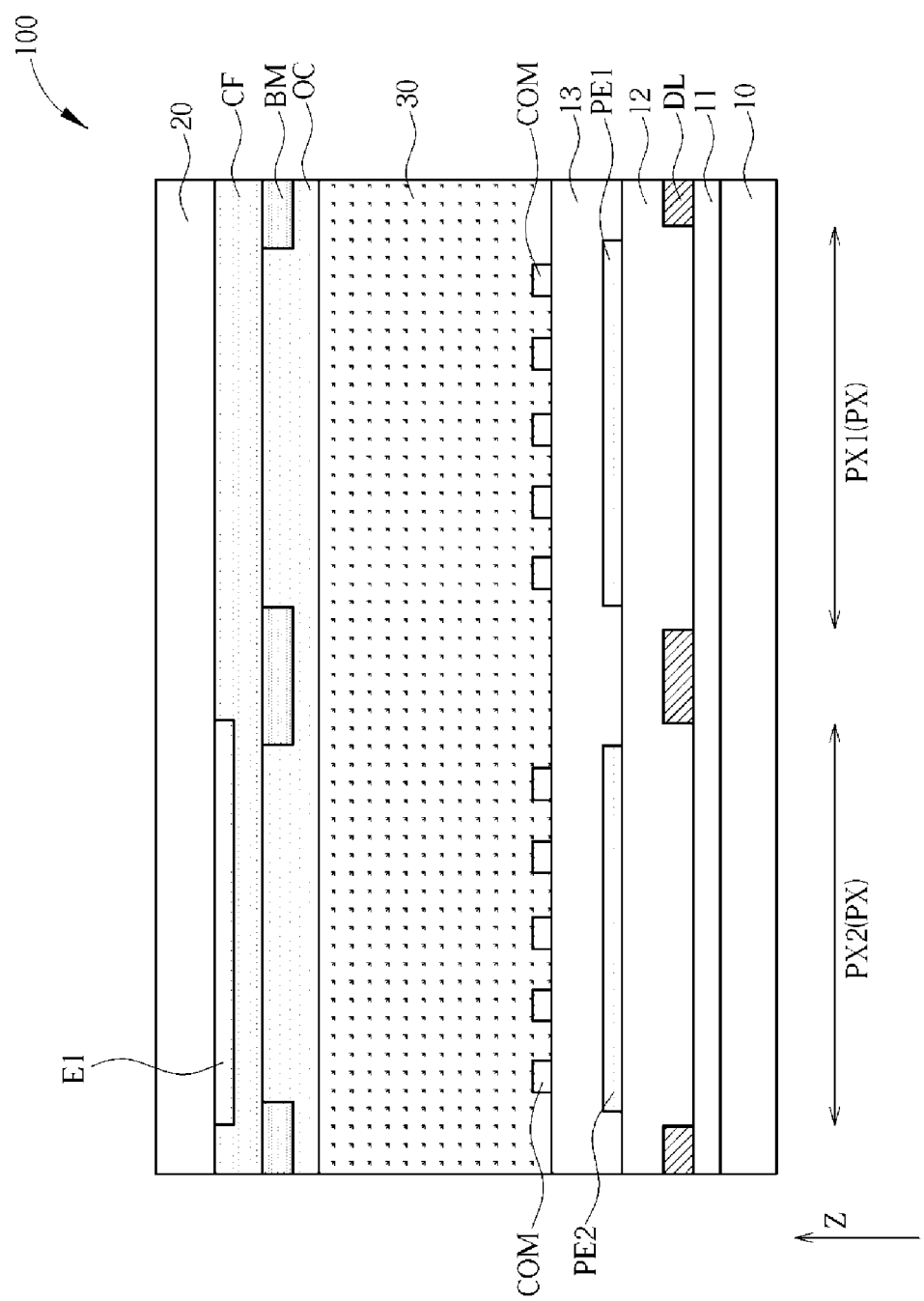
FIG. 2 is a schematic sectional viewing depicted along a line A-A' in FIG. 1.

Please refer to FIG. 1 and FIG. 2. FIG. 1 is a schematic viewing of a liquid crystal display panel of a first embodiment of the present disclosure. FIG. 2 is a schematic sectional viewing depicted along a line A-A' in FIG. 1. For the convenience of description, the drawings of the present disclosure are merely exemplary and are provided for an easier understanding of the present disclosure, and the detailed scales of the drawings can be adjusted according to design requirements. As shown in FIG. 1 and FIG. 2, the present embodiment provides a liquid crystal display panel 100, wherein the liquid crystal display panel 100 comprises a first substrate 10, a second substrate 20, first pixel electrodes PE1, second pixel electrodes PE2, a plurality of common electrodes COM, first auxiliary electrodes E1, and a liquid crystal layer 30. In the liquid crystal display panel 100, a plurality of pixel areas PX is defined, wherein the pixel areas PX are first pixel areas PX1 or second pixel areas PX2. The pixel areas PX may be defined by gate lines GL, data lines DL and/or a patterned light-shielding layer BM interlaced in the liquid crystal display panel 100, but not limited thereto. It should be noted that, only two pixel areas PX, that is, one first pixel area PX1 and one second pixel area PX2, are depicted in FIG. 1 and FIG. 2 for the convenience of description. However, in practice, the liquid crystal display panel 100 may comprise a plurality of first pixel areas PX1 and a plurality of second pixel areas PX2. In other words, the liquid crystal display panel 100 may also comprise a plurality of first pixel electrodes PE1, a plurality of second pixel electrodes PE2, and a plurality of first auxiliary electrodes E1. The second substrate 20 is disposed opposite to the first substrate 10, and the liquid crystal layer 30 is disposed between the first substrate 10 and the second substrate 20. The first substrate 10 and the second substrate 20 may be rigid substrates or flexible substrates. The rigid substrate is, for example, a glass substrate or a ceramic substrate, and the flexible substrate is, for example, a plastic substrate or a substrate formed of other appropriate materials. The first pixel electrodes PE1, the second pixel electrodes PE2, and the common electrodes COM are disposed on the first substrate 10. The first auxiliary electrodes E1 are disposed on the second substrate 20, and one of the first pixel electrodes PE1 is substantially not overlapping one of the first auxiliary electrodes E1 in a vertical projection direction Z. In addition, one of the second pixel electrodes PE2 overlaps one of the first auxiliary electrodes E1 in the vertical projection direction Z.

Further, the first pixel electrodes PE1 are disposed in the first pixel areas PX1, and the second pixel electrodes PE2 are disposed in the second pixel areas PX2, while the first auxiliary electrodes E1 are not overlapping the first pixel electrodes PE1, the first auxiliary electrodes E1 are not disposed in the first pixel areas PX1. In other words, the first auxiliary electrodes E1 are only disposed in a portion of the pixel areas PX rather than all of the pixel areas PX. In addition, other required material layers and/or components may be disposed on the first substrate 10 and the second substrate 20 as required. For example, when the first substrate 10 is an array substrate and the second substrate 20 is a color filter substrate, thin film transistors TFT, data lines DL, gate lines GL, and required insulating material layers (for example, a first dielectric layer 11, a second dielectric layer 12, and a third dielectric layer 13 shown in FIG. 2) may be further disposed on the first substrate 10, and a color filter layer CF, a patterned light-shielding layer BM, and a protection layer OC may be further disposed on the second substrate 20, but not limited thereto.

In a driving method of the liquid crystal display panel 100 of the present embodiment, in a wide viewing angle mode, a first voltage difference provided between the first auxiliary electrodes E1 and the common electrodes COM may be set to be about zero, for example. However, in the wide viewing angle mode, in order to increase the range of viewing angle, the first voltage difference provided between the first auxiliary electrodes E1 and the common electrodes COM may not be zero. In a narrow viewing angle mode, a second voltage difference provided between the first auxiliary electrodes E1 and the common electrodes COM is not zero; however, in order to reduce the range of the viewing angle, the second voltage difference in the narrow viewing angle mode is greater than an operating voltage difference in the wide viewing angle mode. In other words, the liquid crystal display panel 100 can be switched to the wide viewing angle mode or the narrow viewing angle mode by controlling the voltage difference between the first auxiliary electrodes E1 and the common electrodes COM. It should be noted that, since the first auxiliary electrodes E1 configured to achieve a narrow viewing angle display effect are not disposed in the entire pixel areas PX, a front-viewing-angle transmittance in the narrow viewing angle mode can thereby be increased, and on the other hand, since the first pixel electrodes PE1 and the common electrodes COM in the pixel areas PX (for example, the first pixel areas PX1) without the first auxiliary electrodes E1 being disposed are not covered by the first auxiliary electrodes E1, at least a portion of the first pixel electrodes PE1 and/or the common electrodes COM may be configured to perform a touch detection (also referred to as the in cell touch panel on array (ITPA) function). For example, performing a touch detection by utilizing at least a portion of the first pixel electrodes PE1 and/or the common electrodes COM. In other words, the liquid crystal display panel 100 may have a viewing angle control (VAC) function and an ITPA touch detection function. In addition, the number of the first pixel electrodes PE1 may be ⅓, ⅔, or ½ of the total number of the first pixel electrodes PE1 and the second pixel electrodes PE2, but not limited thereto.

Figure 3:
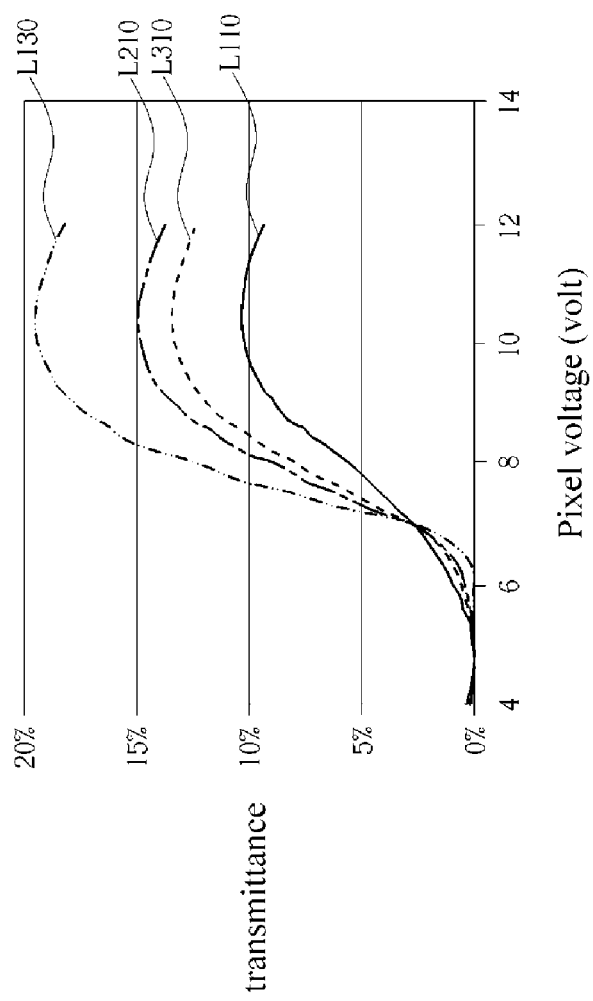
FIG. 3 is a schematic graph of a comparison between front-viewing-angle transmittances of the liquid crystal display panel of the first embodiment of the present invention and a liquid crystal display panel of a comparative embodiment.
Figure 4:
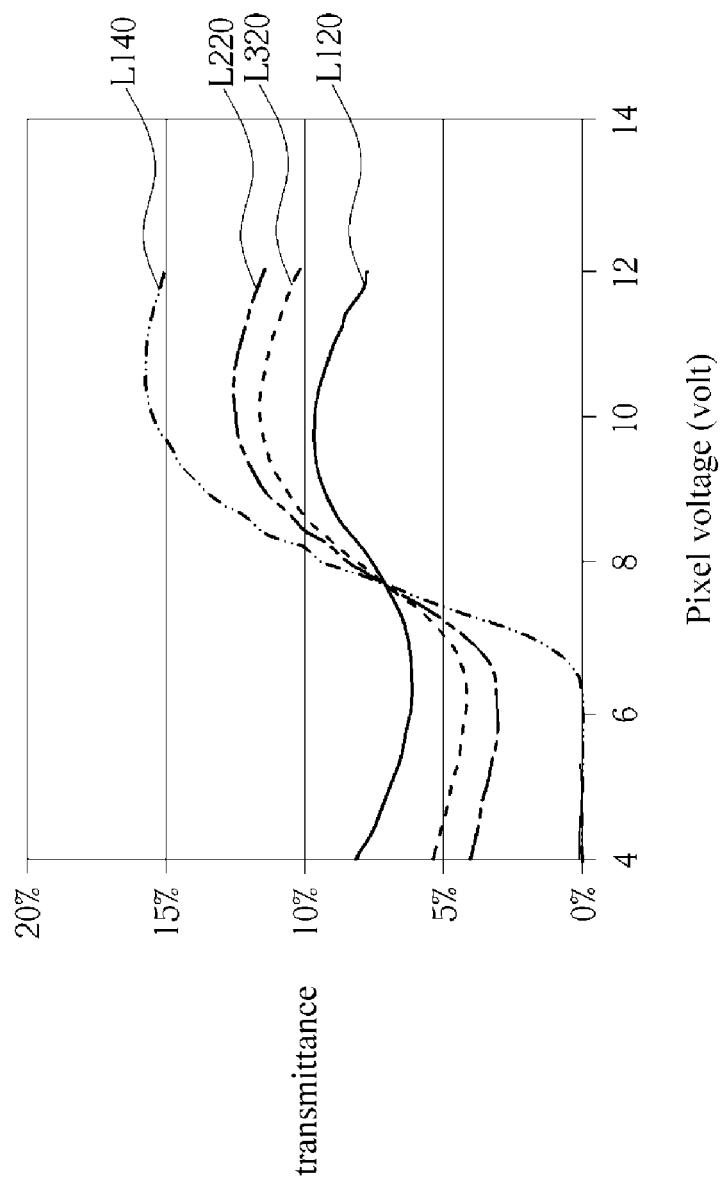
FIG. 4 is a schematic graph of a comparison between side-viewing-angle transmittances of the liquid crystal display panel of the first embodiment of the present invention and the liquid crystal display panel of the comparative embodiment.
Figure 5:
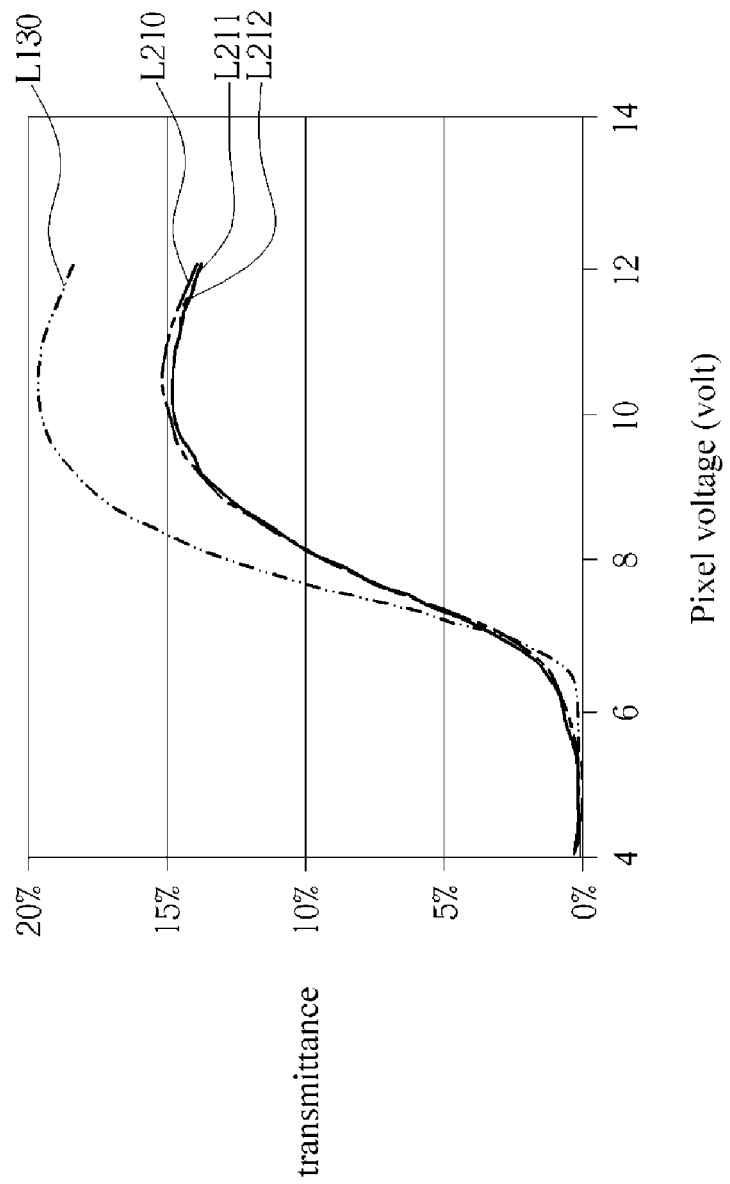
FIG. 5 is a schematic graph of a comparison between front-viewing-angle transmittances of the liquid crystal display panel of the first embodiment of the present invention with different voltages applied to first auxiliary electrodes.
Figure 6:
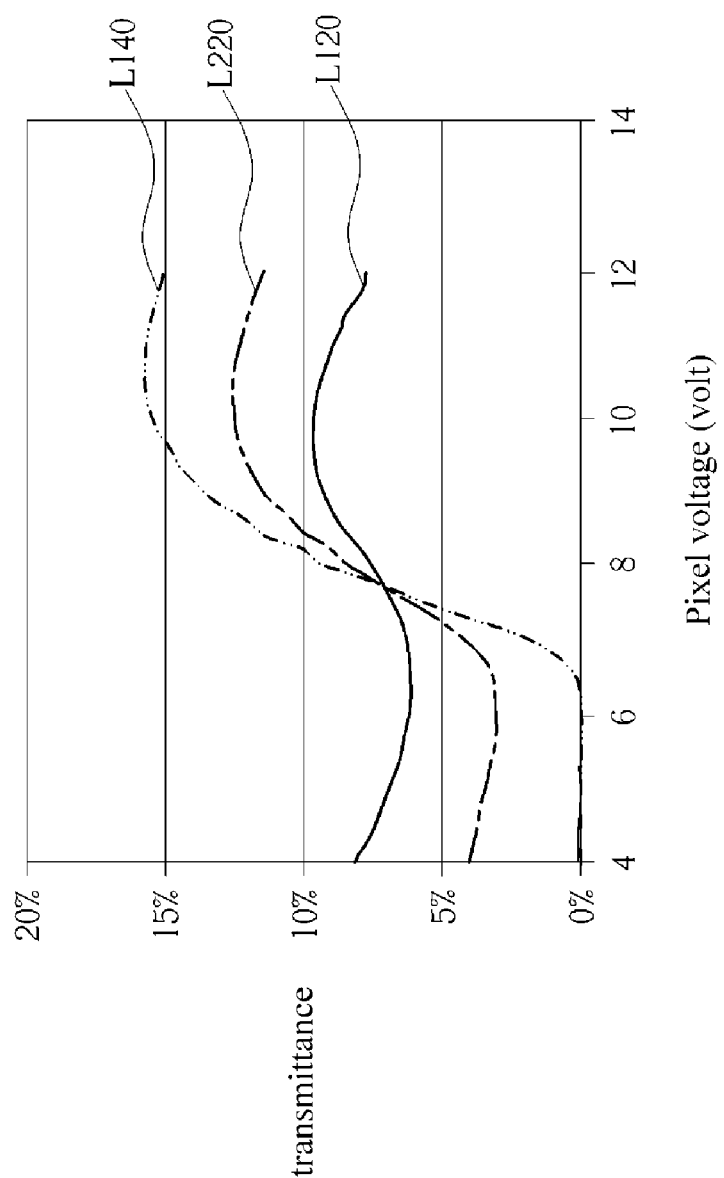
FIG. 6 and FIG. 7 are schematic graphs of a comparison between side-viewing-angle transmittances of the liquid crystal display panel of the first embodiment of the present invention and the liquid crystal display panel of the comparative embodiment with different voltages applied to the first auxiliary electrodes respectively.
Figure 7:
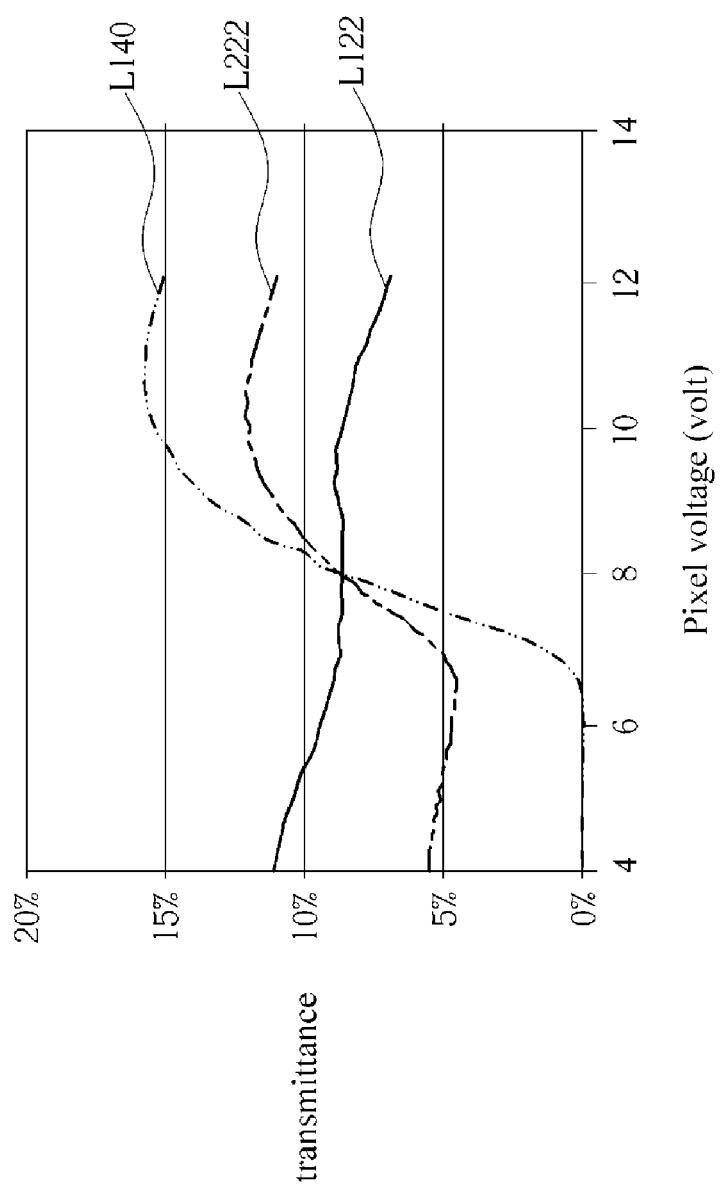

Please refer to FIG. 1 to FIG. 7. FIG. 3 is a schematic graph of a comparison between front-viewing-angle transmittances of the liquid crystal display panel of the present embodiment and a liquid crystal display panel of a comparative embodiment. FIG. 4 is a schematic graph of a comparison between side-viewing-angle transmittances of the liquid crystal display panel of the present embodiment and the liquid crystal display panel of the comparative embodiment. FIG. 5 is a schematic graph of a comparison between front-viewing-angle transmittances of the liquid crystal display panel of the present embodiment with different voltages applied to the first auxiliary electrodes. FIG. 6 and FIG. 7 are schematic graphs of a comparison between side-viewing-angle transmittances of the liquid crystal display panel of the present embodiment and the liquid crystal display panel of the comparative embodiments with different voltages applied to the first auxiliary electrodes respectively. The difference between the liquid crystal display panel of the comparative embodiment and the liquid crystal display panel of the present embodiment is that, the first auxiliary electrodes in the liquid crystal display panel of the comparative embodiment are disposed in the entire pixel areas. In addition, the side-viewing-angle transmittance is a display result in the case that a side viewing angle is about 50 degrees.

As shown in FIG. 1, FIG. 2, and FIG. 3, a line L110 represents a front-viewing-angle transmittance of the liquid crystal display panel of the comparative embodiment in the narrow viewing angle mode, a line L130 represents a front-viewing-angle transmittance of the liquid crystal display panel of the comparative embodiment in the wide viewing angle mode, a line 210 represents a front-viewing-angle transmittance of the liquid crystal display panel 100 of the present embodiment in the narrow viewing angle mode with the number of the first pixel electrodes PE1 being ½ of the total number of the first pixel electrodes PE1 and the second pixel electrodes PE2, and a line L310 represents a front-viewing-angle transmittance of the liquid crystal display panel 100 of the present embodiment in the narrow viewing angle mode with the number of the first pixel electrodes PE1 being ⅔ of the total number of the first pixel electrodes PE1 and the second pixel electrodes PE2. It can be known from FIG. 3 that, when the first auxiliary electrodes E1 are disposed only in a portion of the pixel areas PX (that is, when the first pixel electrodes PE1 are not overlapping the first auxiliary electrodes E1), the front-viewing-angle transmittance in the narrow viewing angle mode can be effectively increased; and when the number of pixel areas PX without the first auxiliary electrodes E1 being disposed is increased (that is, when a relative proportion of the number of the first pixel electrodes PE1 that are not overlapping the first auxiliary electrodes E1 is higher), a higher degree of increase in the front-viewing-angle transmittance can be obtained.

In addition, as shown in FIG. 1, FIG. 2, and FIG. 4, a line L120 represents a side-viewing-angle transmittance of the liquid crystal display panel of the comparative embodiment in the narrow viewing angle mode, a line L140 represents a side-viewing-angle transmittance of the liquid crystal display panel of the comparative embodiment in the wide viewing angle mode, a line L220 represents a side-viewing-angle transmittance of the liquid crystal display panel 100 of the present embodiment in the narrow viewing angle mode with the number of the first pixel electrodes PE1 being ½ of the total number of the first pixel electrodes PE1 and the second pixel electrodes PE2, and a line L320 represents a side-viewing-angle transmittance of the liquid crystal display panel 100 of the present embodiment in the narrow viewing angle mode with the number of the first pixel electrodes PE1 being ⅔ of the total number of the first pixel electrodes PE1 and the second pixel electrodes PE2. It can be known from FIG. 4 that, although the side-viewing-angle transmittance may also be increased along with the increase in the proportion of the number of the first pixel electrodes PE1 not overlapping the first auxiliary electrodes E1, a side-viewing-angle display contrast in the narrow viewing angle mode is still lower than a side-viewing-angle display contrast in the wide viewing angle mode, that is to say, a narrow viewing angle display effect can still be presented.

In addition, in the driving method of the liquid crystal display panel 100 of the present embodiment, the side-viewing-angle display contrast may be further reduced by adjusting the voltage difference between the first auxiliary electrodes E1 and the second pixel electrodes PE2. As shown in FIG. 1, FIG. 2, and FIG. 5 to FIG. 7, the line L210 represents a front-viewing-angle transmittance of the liquid crystal display panel 100 of the present embodiment in the narrow viewing angle mode with the number of the first pixel electrodes PE1 being ½ of the total number of the first pixel electrodes PE1 and the second pixel electrodes PE2 and a 5 volts voltage difference between the common electrodes COM and the second pixel electrodes PE2, a line L211 represents a front-viewing-angle transmittance of the liquid crystal display panel 100 of the present embodiment in the narrow viewing angle mode with the number of the first pixel electrodes PE1 being ½ of the total number of the first pixel electrodes PE1 and the second pixel electrodes PE2 and a 6 volts voltage difference between the common electrodes COM and the second pixel electrodes PE2, a line 212 represents a front-viewing-angle transmittance of the liquid crystal display panel 100 of the present embodiment in the narrow viewing angle mode with the number of the first pixel electrodes PE1 being ½ of the total number of the first pixel electrodes PE1 and the second pixel electrodes PE2 and a 7 volts voltage difference between the common electrodes COM and the second pixel electrodes PE2, the line L220 represents a side-viewing-angle transmittance of the liquid crystal display panel 100 of the present embodiment in the narrow viewing angle mode with the number of the first pixel electrodes PE1 being ½ of the total number of the first pixel electrodes PE1 and the second pixel electrodes PE2 and a 5 volts voltage difference between the common electrodes COM and the second pixel electrodes PE2, and the line L120 represents a side-viewing-angle transmittance of the liquid crystal display panel of the comparative embodiment in the narrow viewing angle mode with a 5 volts voltage difference between the common electrodes COM and the second pixel electrodes PE2. A line L222 represents a side-viewing-angle transmittance of the liquid crystal display panel 100 of the present embodiment in the narrow viewing angle mode with the number of the first pixel electrodes PE1 being ½ of the total number of the first pixel electrodes PE1 and the second pixel electrodes PE2 and a 7 volts voltage difference between the common electrodes COM and the second pixel electrodes PE2, and a line L122 represents a side-viewing-angle transmittance of the liquid crystal display panel of the comparative embodiment in the narrow viewing angle mode with a 7 volts voltage difference between the common electrodes COM and the second pixel electrodes PE2. It can be known from FIG. 5 to FIG. 7 that, the increase of the voltage difference can effectively reduce the side-viewing-angle display contrast in the narrow viewing angle mode without affecting a front-viewing-angle display contrast in the narrow viewing angle mode.

Figure 8:
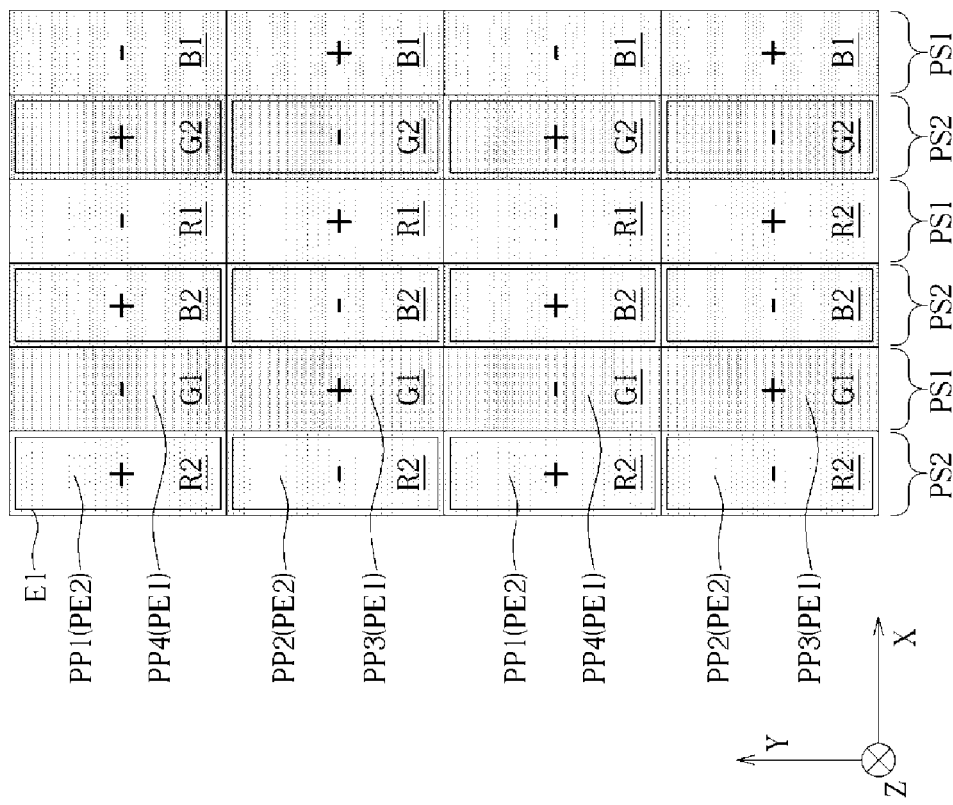
FIG. 8 is a schematic view of a way of disposing the first auxiliary electrodes of the liquid crystal display panel of the first embodiment of the present invention in a first aspect.

Next, different ways of disposing the first auxiliary electrodes of the present embodiment are described in multiple aspects. Please refer to FIG. 1, FIG. 2, and FIG. 8. FIG. 8 is a schematic view of a way of disposing the first auxiliary electrodes of the liquid crystal display panel of the present embodiment in a first aspect. As shown in FIG. 1, FIG. 2, and FIG. 8, multiple first pixel electrodes PE1 may be arranged along a first direction Y to form a first pixel electrode set PS1, thereby forming multiple first pixel electrode sets PS1 arranged along a second direction X, multiple second pixel electrodes PE2 may be arranged in the first direction Y to form a second pixel electrode set PS2, thereby forming multiple second pixel electrode sets PS2 arranged along the second direction X, and the multiple first pixel electrode sets PS1 and the multiple second pixel electrode sets PS2 may be, for example, alternately arranged along the second direction X. The first direction Y may be orthogonal to the second direction X, but not limited thereto. When each of the gate lines GL extends along the second direction X and each of the data lines DL extends along the first direction Y, the first pixel electrode set PS1 may be considered as a first pixel electrode column and the second pixel electrode set PS2 may be considered as a second pixel electrode column, but not limited thereto. In this aspect, the number of the first pixel electrodes PE1 is ½ of the total number of the first pixel electrodes PE1 and the second pixel electrodes PE2 and the number of the first pixel electrodes PE1 is the same as the number of the second pixel electrodes PE2, but not limited thereto. In addition, the first pixel electrodes PE1 correspond to a first color, a second color, and a third color (for example, a red color, a green color, and a blue color) respectively and the second pixel electrodes PE2 correspond to the first color, the second color, and the third color respectively, but not limited thereto. The numbers of the first pixel electrodes PE1 and the second pixel electrodes PE2 corresponding to the same color are the same. For example, the first pixel areas PX may comprise a plurality of first color first pixel areas R1, a plurality of second color first pixel areas G1, and a plurality of third color first pixel areas B1, and the second pixel areas PX2 may comprise a plurality of first color second pixel areas R2, a plurality of second color second pixel areas G2, and a plurality of third color second pixel areas B2. The first auxiliary electrodes E1 are only disposed in the first color second pixel areas R2, the second color second pixel areas G2, and the third color second pixel areas B2, and the first auxiliary electrodes E1 are not disposed in the first color first pixel areas R1, the second color first pixel areas G1, or the third color first pixel areas B1. In the present aspect, the number of the first color first pixel areas R1 is the same as the number of the first color second pixel areas R2, the number of the second color first pixel areas G1 is the same as the number of the second color second pixel areas G2, and the number of the third color first pixel areas B1 is the same as the number of the third color second pixel areas B2.

In addition, it should be noted that, in the driving method of the liquid crystal display panel 100, the second pixel electrodes PE2 may comprise a plurality of first polarity pixel electrodes PP1 and a plurality of second polarity pixel electrodes PP2, wherein a driving polarity of the first polarity pixel electrode PP1 is opposite to a driving polarity of the second polarity pixel electrode PP2 (for example, in a display frame, the first polarity pixel electrode PP1 and the second polarity pixel electrode PP2 have a positive polarity and a negative polarity respectively), and the first pixel electrodes PE1 may comprise a plurality of third polarity pixel electrodes PP3 and a plurality of fourth polarity pixel electrodes PP4, wherein a driving polarity of the third polarity pixel electrode PP3 is opposite to a driving polarity of the fourth polarity pixel electrode PP4 (for example, in the above-mentioned display frame, the third polarity pixel electrode PP3 and the fourth polarity pixel electrode PP4 have a positive polarity and a negative polarity respectively). In the above driving polarity design, the driving manner shown in FIG. 8 may be regarded as a dot-inversion driving manner. Each of the first auxiliary electrodes E1 is disposed corresponding to one of the first polarity pixel electrodes PP1 or one of the second polarity pixel electrodes PP2, and the number of the first polarity pixel electrodes PP1 is the same as the number of the second polarity pixel electrodes PP2. The first auxiliary electrodes E1 are not disposed corresponding to the third polarity pixel electrodes PP3 or the fourth polarity pixel electrodes PP4, and the number of the third polarity pixel electrodes PP3 is the same as the number of the fourth polarity pixel electrodes PP4. Accordingly, an abnormal display frame (such as a flicker) caused by a display difference between pixel areas can be further improved, for example.

Figure 9:
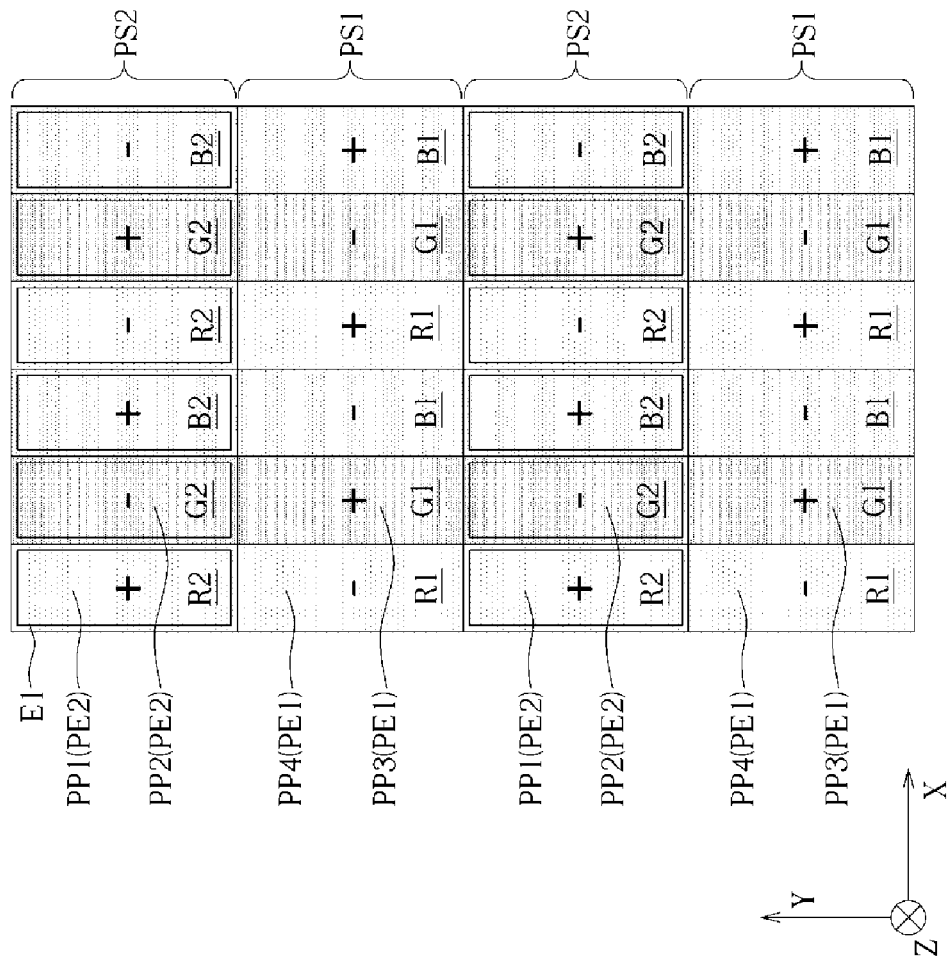
FIG. 9 is a schematic view of a way of disposing the first auxiliary electrodes of the liquid crystal display panel of the first embodiment of the present invention in a second aspect.

Please refer to FIG. 1, FIG. 2, and FIG. 9. FIG. 9 is a schematic view of a way of disposing the first auxiliary electrodes of the liquid crystal display panel of the present embodiment in a second aspect. As shown in FIG. 1, FIG. 2, and FIG. 9, the difference between the first aspect and the present aspect is that, in the present aspect, multiple first pixel electrodes PE1 may be arranged along the second direction X to form a first pixel electrode set PS1, thereby forming multiple first pixel electrode sets PS1 arranged along the first direction Y, multiple second pixel electrodes PE2 may be arranged along the second direction X to form a second pixel electrode set PS2, thereby forming multiple second pixel electrode sets PS2 arranged along the first direction Y, and the multiple first pixel electrode sets PS1 and the multiple second pixel electrode sets PS2 may be, for example, alternately arranged along the first direction Y. When each of the gate lines GL extends along the second direction X and each of the data lines DL extends along the first direction Y, the first pixel electrode set PS1 may be considered as a first pixel electrode row and the second pixel electrode set PS2 may be considered as a second pixel electrode row, but not limited thereto.

Figure 10:
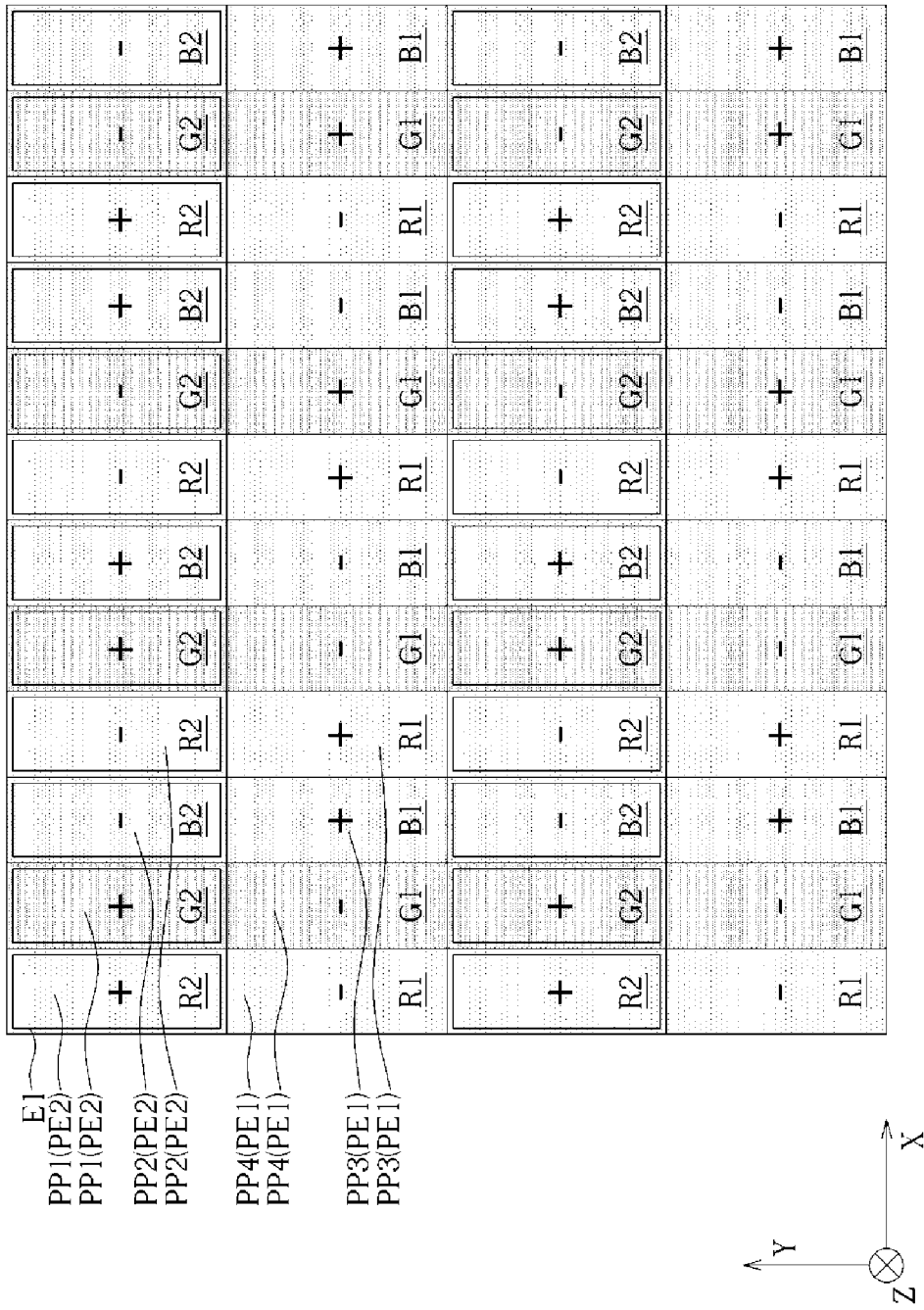
FIG. 10 is a schematic view of a way of disposing the first auxiliary electrodes of the liquid crystal display panel of the first embodiment of the present invention in a third aspect.

Please refer to FIG. 1, FIG. 2, and FIG. 10. FIG. 10 is a schematic view of a way of disposing the first auxiliary electrodes of the liquid crystal display panel of the present embodiment in a third aspect. As shown in FIG. 1, FIG. 2, and FIG. 10, the difference between the second aspect and the present aspect is that, the driving method in the present aspect may be regarded as a two-dot-inversion driving manner. In other words, the way of disposing the first auxiliary electrodes E1 in different columns separated from each other may be applicable to both the dot-inversion driving manner and the two-dot-inversion driving manner.

Figure 11:
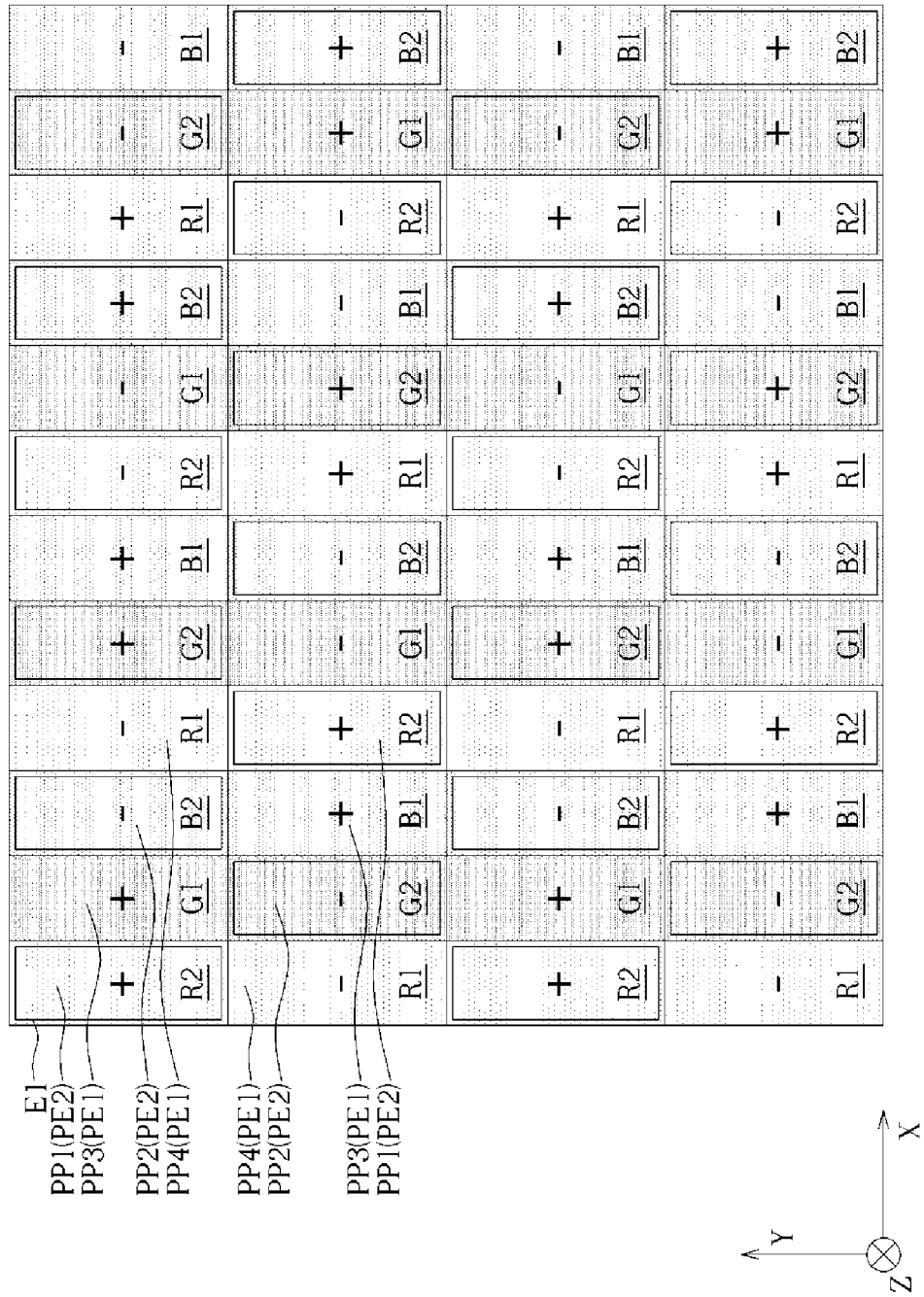
FIG. 11 is a schematic view of a way of disposing the first auxiliary electrodes of the liquid crystal display panel of the first embodiment of the present invention in a fourth aspect.

Please refer to FIG. 1, FIG. 2, and FIG. 11. FIG. 11 is a schematic view of a way of disposing the first auxiliary electrodes of the liquid crystal display panel of the present embodiment in a fourth aspect. As shown in FIG. 1, FIG. 2, and FIG. 11, the difference between the third aspect and the present aspect is that, in the present aspect, the first pixel electrodes PE1 and the second pixel electrodes PE2 are alternately arranged along the first direction Y and the second direction X.

Figure 12:
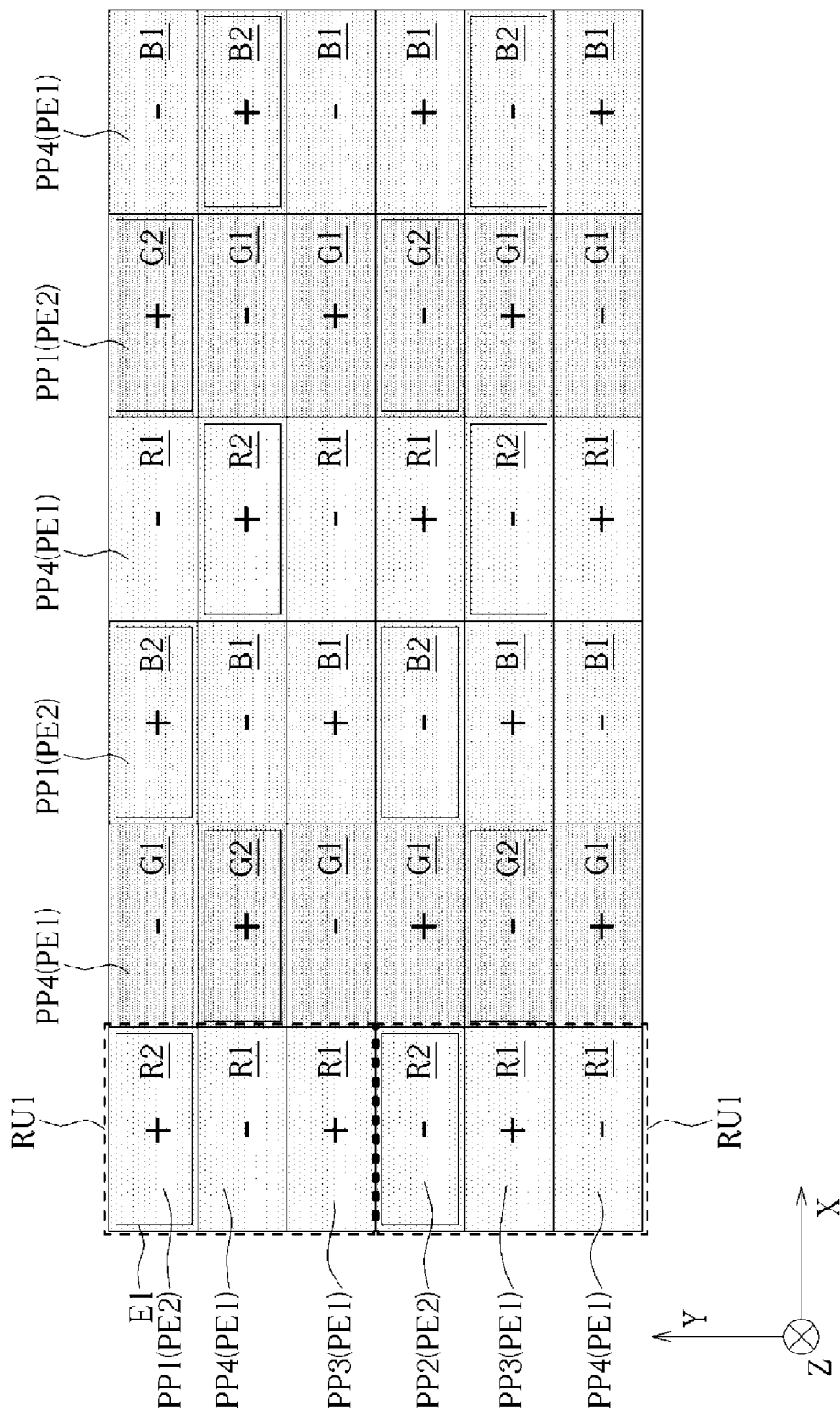
FIG. 12 is a schematic view of a way of disposing the first auxiliary electrodes of the liquid crystal display panel of the first embodiment of the present disclosure in a fifth aspect.

Please refer to FIG. 1, FIG. 2, and FIG. 12. FIG. 12 is a schematic view of a way of disposing the first auxiliary electrodes of the liquid crystal display panel of the present embodiment in a fifth aspect. As shown in FIG. 1, FIG. 2, and FIG. 12, the difference between the first aspect and the present aspect is that, in the present aspect, the number of the first pixel electrodes PE1 is ⅔ of the total number of the first pixel electrodes PE1 and the second pixel electrodes PE2, and one second pixel electrode PE2 and two first pixel electrodes PE1 form a repeating unit (for example, a first repeating unit RU1 shown in FIG. 12), thereby forming a plurality of repeating units. In the present aspect, each of the first repeating units RU1 only has one first auxiliary electrode E1, and as for a single pixel area PX column (one pixel area PX column that extends along the first direction Y), adjacent pixel areas PX with the corresponding first auxiliary electrodes E1 are separated by two adjacent pixel areas PX without the corresponding first auxiliary electrodes E1 therebeween; as for a single pixel area PX row (one pixel area PX row that extends along the second direction X), adjacent pixel areas PX with the corresponding first auxiliary electrodes E1 are separated by one pixel area PX without the corresponding first auxiliary electrode E1 therebetween, while in two adjacent first repeating units RU1 arranged along the second direction X, the first auxiliary electrodes E1 are staggered, but the present disclosure is not limited thereto.

Figure 13:
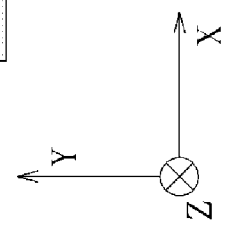
FIG. 13 is a schematic view of a way of disposing the first auxiliary electrodes of the liquid crystal display panel of the first embodiment of the present disclosure in a sixth aspect.

Please refer to FIG. 1, FIG. 2, and FIG. 13. FIG. 13 is a schematic view of a way of disposing the first auxiliary electrodes of the liquid crystal display panel of the present embodiment in a sixth aspect. As shown in FIG. 1, FIG. 2, and FIG. 13, the difference between the fifth aspect and the present aspect is that, in the present aspect, the second pixel electrodes PE2 may be successively arranged along the second direction X, and two adjacent first pixel electrodes PE1 may be disposed between two adjacent second pixel electrodes PE2 in the first direction Y.

Figure 14:
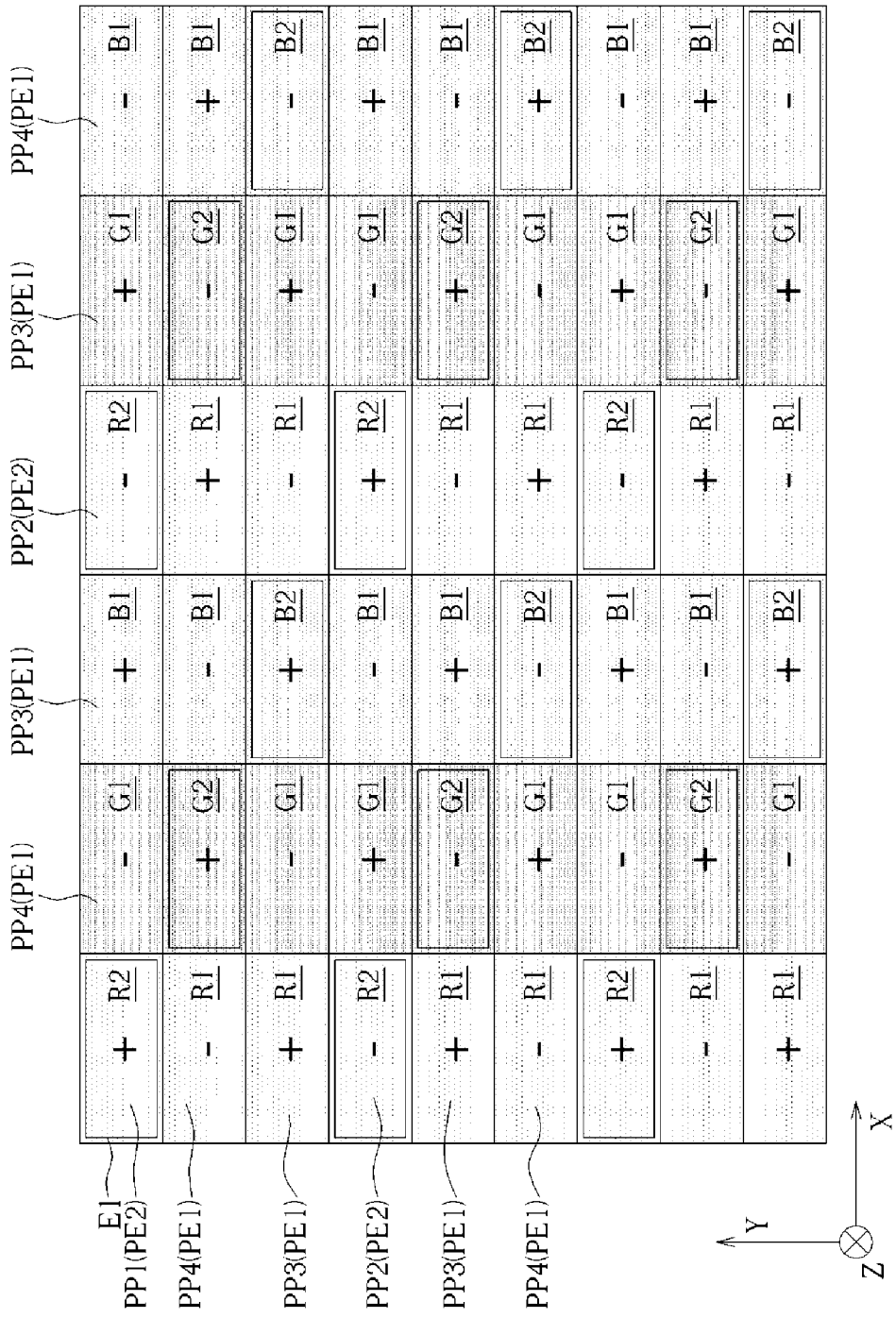
FIG. 14 is a schematic view of a way of disposing the first auxiliary electrodes of the liquid crystal display panel of the first embodiment of the present disclosure in a seventh aspect.

Please refer to FIG. 1, FIG. 2, and FIG. 14. FIG. 14 is a schematic view of a way of disposing the first auxiliary electrodes of the liquid crystal display panel of the present embodiment in a seventh aspect. As shown in FIG. 1, FIG. 2, and FIG. 14, the difference between the fifth aspect and the present aspect is that, in the present aspect, the first pixel electrodes PE1 and the second pixel electrodes PE2 may be respectively arranged in an oblique direction different from the first direction Y and the second direction X.

Figure 15:
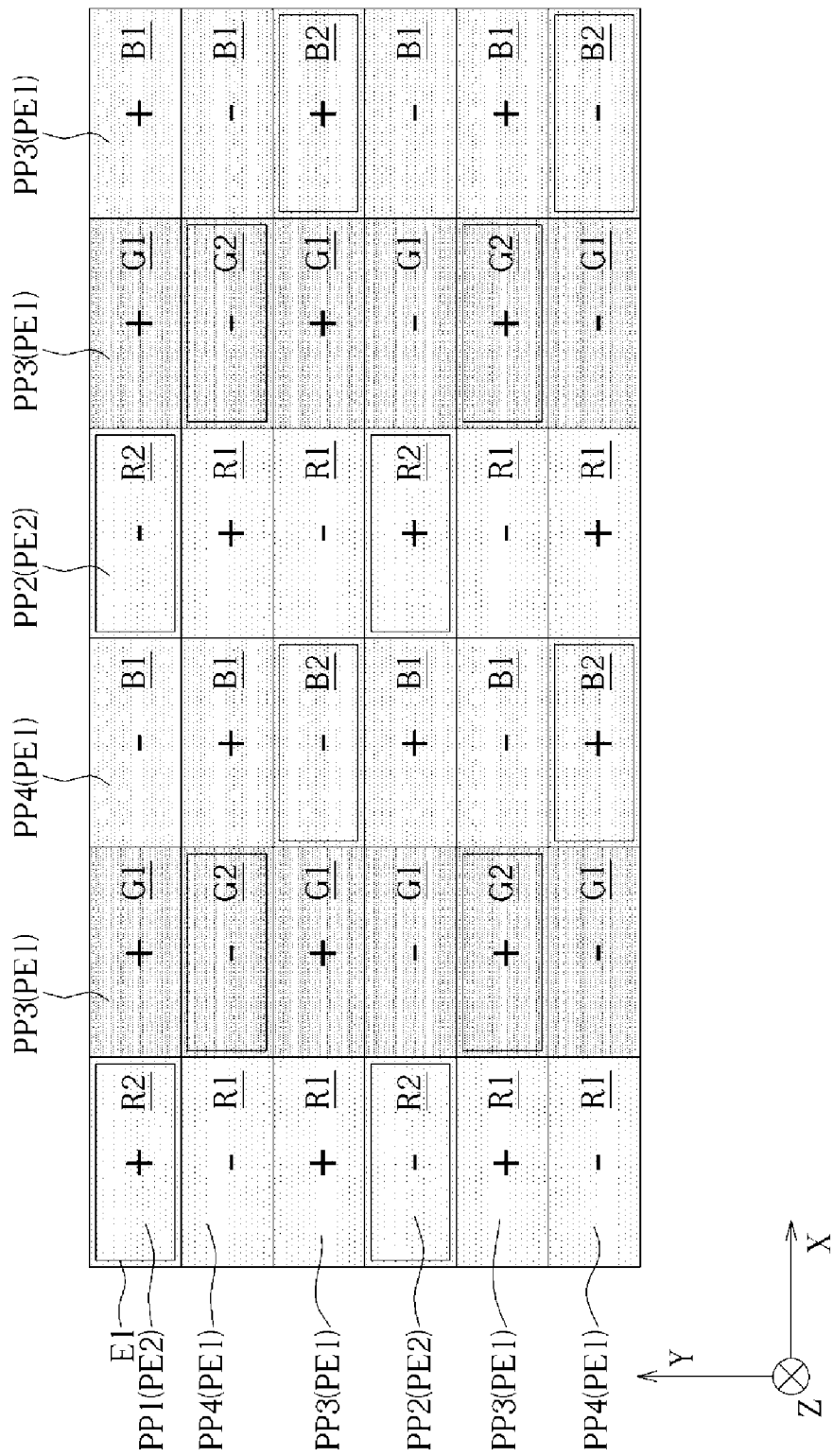
FIG. 15 is a schematic view of a way of disposing the first auxiliary electrodes of the liquid crystal display panel of the first embodiment of the present disclosure in an eighth aspect.

Please refer to FIG. 1, FIG. 2, and FIG. 15. FIG. 15 is a schematic view of a way of disposing the first auxiliary electrodes of the liquid crystal display panel of the present embodiment in an eighth aspect. As shown in FIG. 1, FIG. 2, and FIG. 15, the difference between the seventh aspect and the present aspect is that, the driving method in the present aspect may be regarded as a two-dot-inversion driving manner. In other words, the way of disposing of respectively arranging the first pixel electrodes PE1 and the second pixel electrodes PE2 along an oblique direction different from the first direction Y and the second direction X may be applicable to both the dot-inversion driving manner and the two-dot-inversion driving manner.

Figure 16:
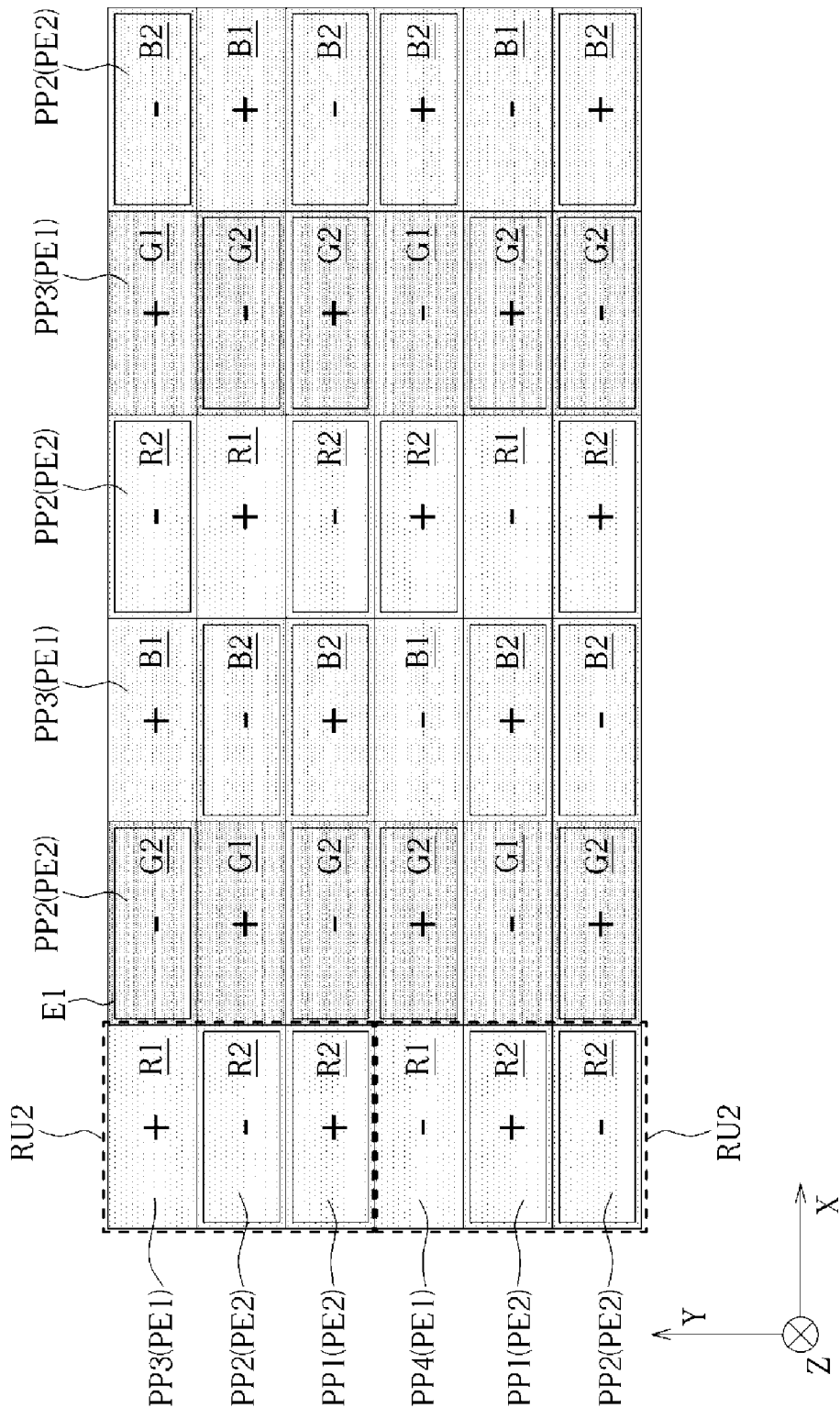
FIG. 16 is a schematic view of a way of disposing the first auxiliary electrodes of the liquid crystal display panel of the first embodiment of the present disclosure in a ninth aspect.

Please refer to FIG. 1, FIG. 2, and FIG. 16. FIG. 16 is a schematic view of a way of disposing the first auxiliary electrodes of the liquid crystal display panel of the present embodiment in a ninth aspect. As shown in FIG. 1, FIG. 2, and FIG. 16, the difference between the fifth aspect and the present aspect is that, in the present aspect, the number of the first pixel electrodes PE1 is ⅓ of the total number of the first pixel electrodes PE1 and the second pixel electrodes PE2, and one first pixel electrode PE1 and two second pixel electrodes PE2 form a repeating unit, thereby forming a plurality of repeating units (for example, second repeating units RU2 shown in FIG. 16). In the present aspect, each of the second repeating units RU2 only has two first auxiliary electrodes E1, but not limited thereto.

Figure 17:
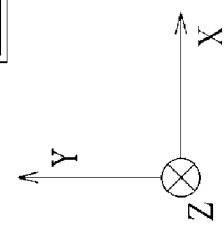
FIG. 17 is a schematic view of a way of disposing the first auxiliary electrodes of the liquid crystal display panel of the first embodiment of the present disclosure in a tenth aspect.

Please refer to FIG. 1, FIG. 2, and FIG. 17. FIG. 17 is a schematic view of a way of disposing the first auxiliary electrodes of the liquid crystal display panel of the present embodiment in a tenth aspect. As shown in FIG. 1, FIG. 2, and FIG. 17, the difference between the ninth aspect and the present aspect is that, in the present aspect, the first pixel electrodes PE1 may be arranged along the second direction X, and two adjacent second pixel electrodes PE2 may be disposed between two adjacent first pixel electrodes PE1 in the first direction Y.

Figure 18:
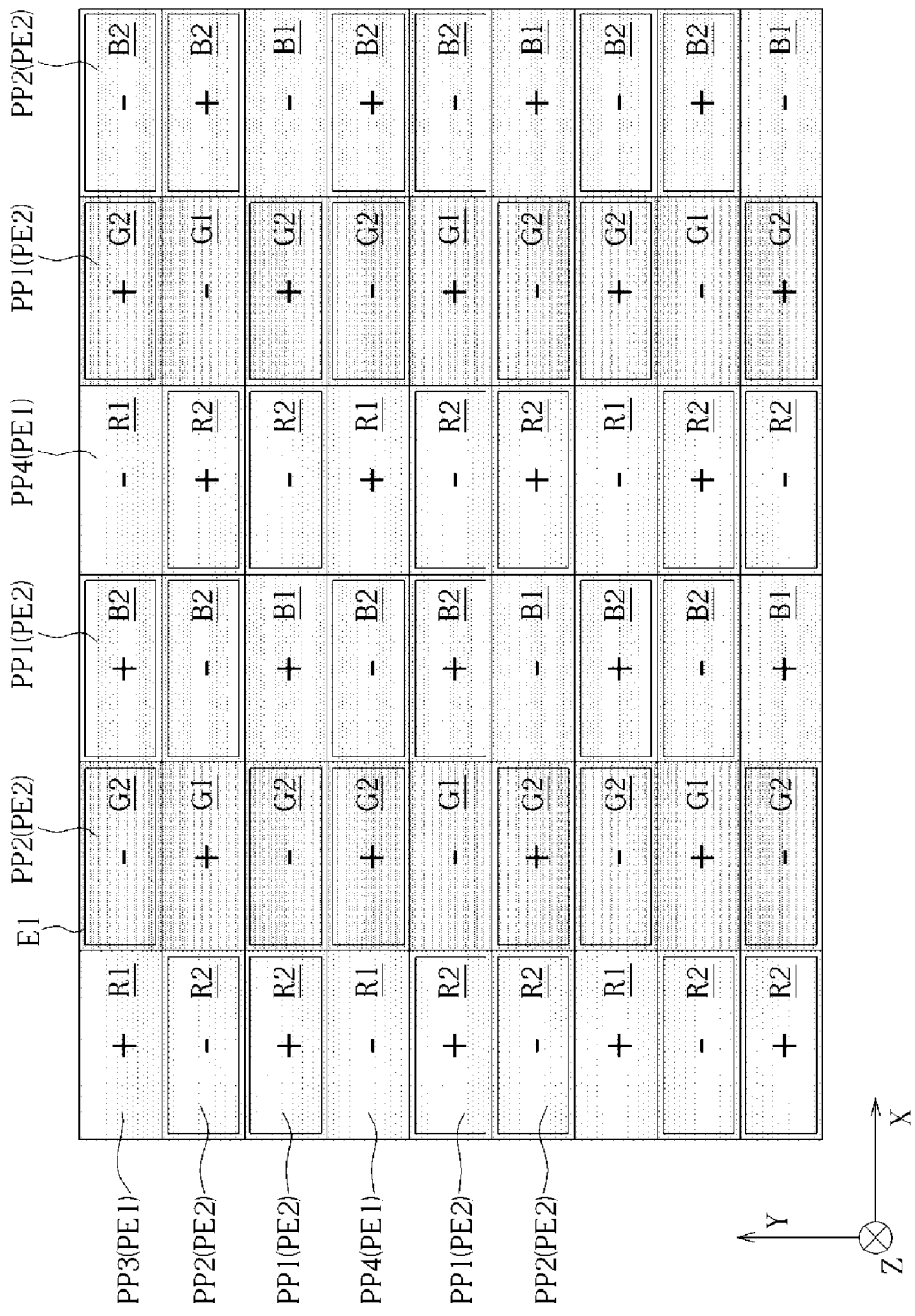
FIG. 18 is a schematic view of a way of disposing the first auxiliary electrodes of the liquid crystal display panel of the first embodiment of the present disclosure in an eleventh aspect.

Please refer to FIG. 1, FIG. 2, and FIG. 18. FIG. 18 is a schematic view of a way of disposing the first auxiliary electrodes of the liquid crystal display panel of the present embodiment in an eleventh aspect. As shown in FIG. 1, FIG. 2, and FIG. 18, the difference between the ninth aspect and the present aspect is that, in the present aspect, the first pixel electrodes PE1 and the second pixel electrodes PE2 may be respectively arranged along an oblique direction different from the first direction Y and the second direction X.

It should be noted that, the disposing and distribution of the first auxiliary electrodes of the present disclosure and the driving manner of the liquid crystal display panel are not limited to the first to eleventh aspects. Other appropriate ways of disposing and distributing the first auxiliary electrodes and other appropriate inversion driving manners may also be applicable to the liquid crystal display panel of the present disclosure.

Different embodiments of the present disclosure are described below. For the simplification of description, differences between the embodiments are described in detail, and similar details of the embodiments will not be repeatedly described. In addition, same elements in the embodiments of the present disclosure are labeled with the same reference numerals for easy referencing between each of the embodiments.

Figure 19:
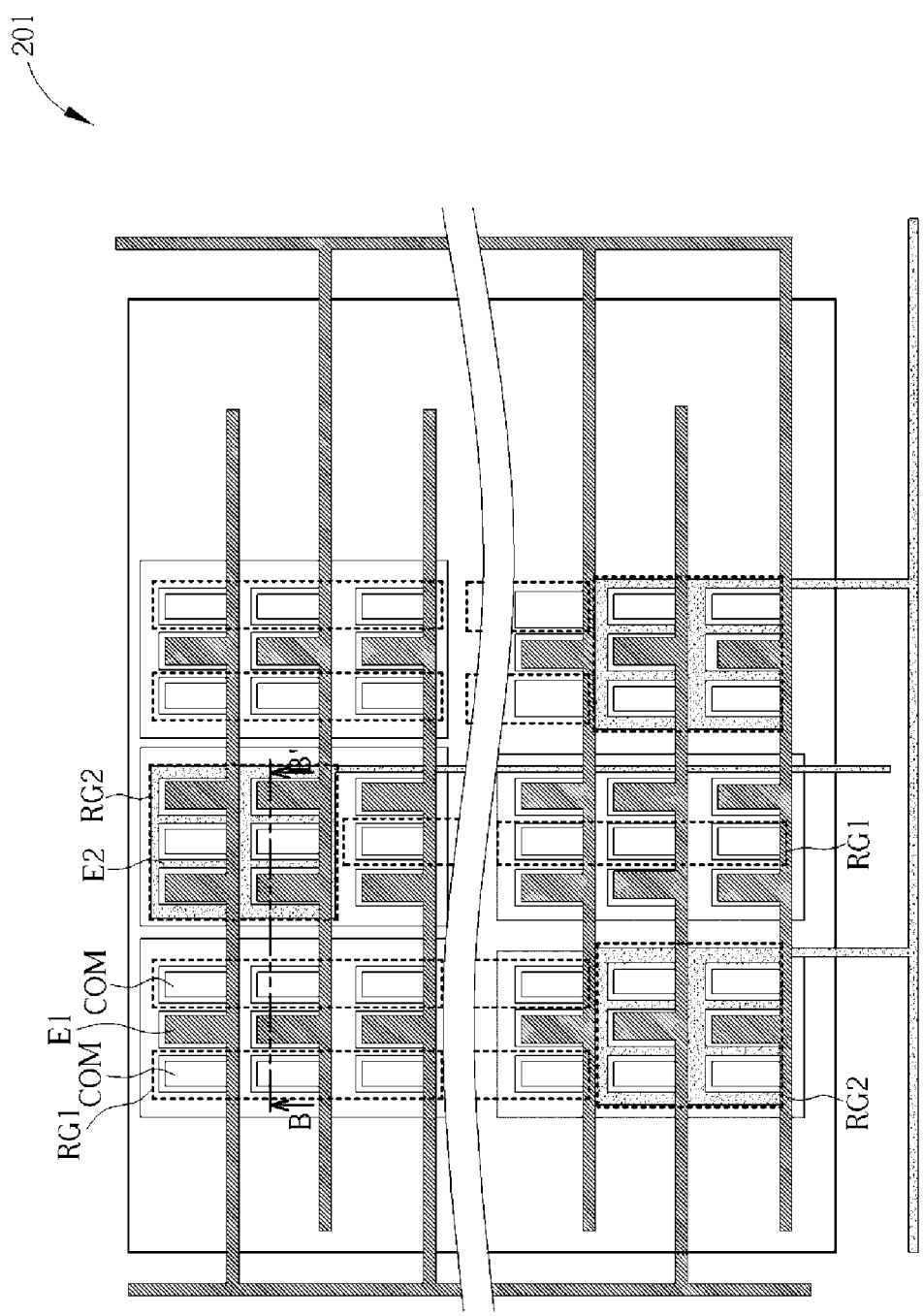
FIG. 19 is a schematic view of a liquid crystal display panel of a second embodiment of the present disclosure.
Figure 20:
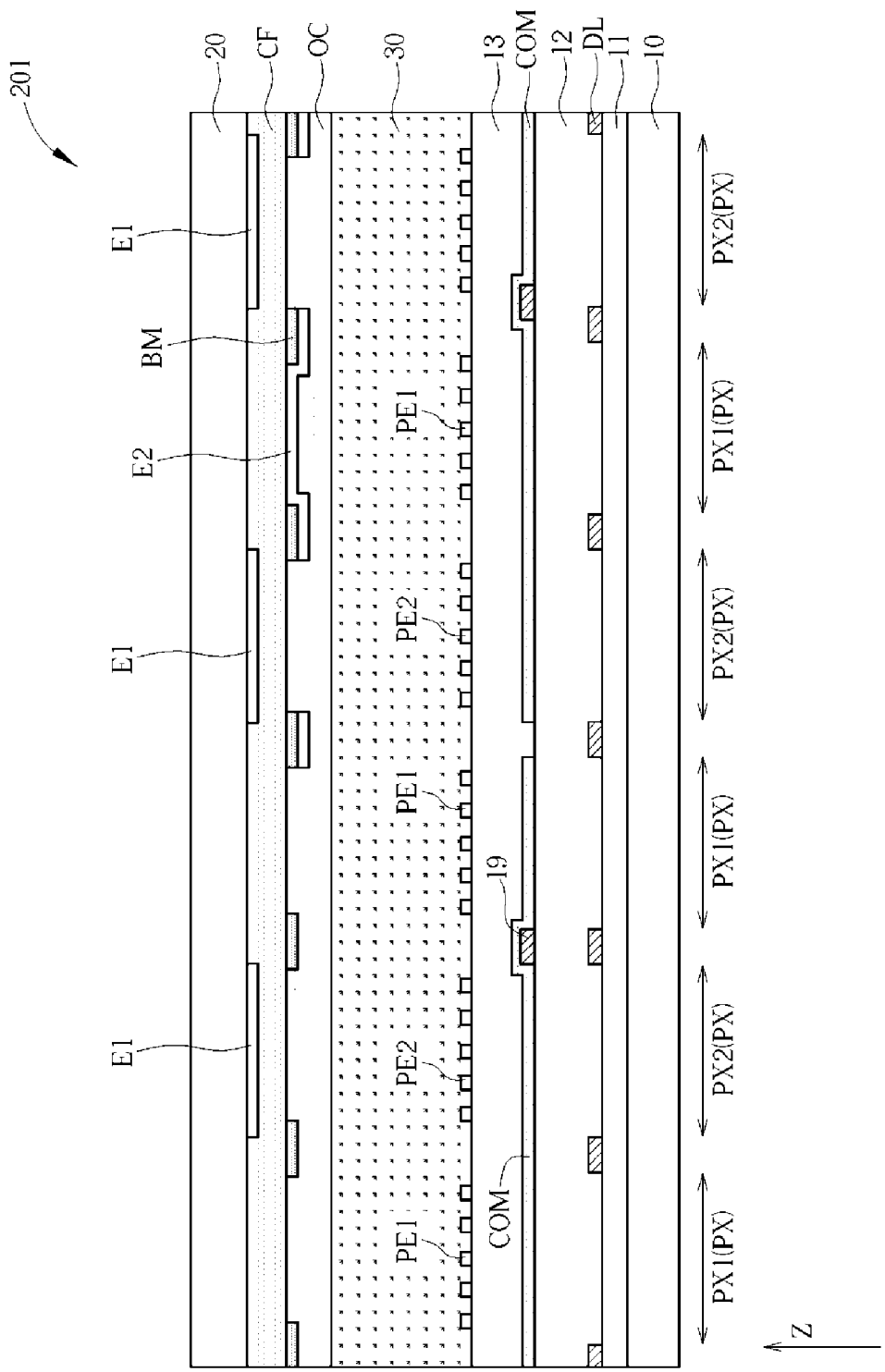
FIG. 20 is a schematic sectional view depicted along a line B-B' in FIG. 19.

Please refer to FIG. 19 and FIG. 20. FIG. 19 is a schematic view of a liquid crystal display panel 201 of a second embodiment of the present disclosure. FIG. 20 is a schematic sectional view depicted along a line B-B' in FIG. 19. As shown in FIG. 19 and FIG. 20, the difference between the liquid crystal display panel of the first embodiment and the liquid crystal display panel 201 of the present embodiment is that, the liquid crystal display panel 201 of the present embodiment further comprises a plurality of second auxiliary electrodes E2 disposed on the second substrate 20 and electrically isolated from the first auxiliary electrodes E1. The second auxiliary electrodes E2 overlap the first pixel electrodes PE1 respectively in the vertical projection direction Z, and the second pixel electrodes PE2 are not overlapping the second auxiliary electrodes E2 in the vertical projection direction Z. In the present embodiment, the first auxiliary electrodes E1 are disposed between the color filter layer CF and the second substrate 20, and the second auxiliary electrodes E2 are disposed between the color filter layer CF and the liquid crystal layer 30. The protection layer OC is disposed on the second substrate 20 and covers the first auxiliary electrodes E1, the color filter layer CF, and the patterned light-shielding layer BM. In addition, the common electrode COM of the present embodiment may transfer a signal through a patterned metal layer 19, but not limited thereto. The second auxiliary electrodes E2 of the present embodiment are at least partially disposed between the color filter layer CF and the protection layer OC, and the second auxiliary electrodes E2 are further at least partially disposed between the patterned light-shielding layer BM and the protection layer OC. In other words, the second auxiliary electrodes E2 may be formed after forming the patterned light-shielding layer BM and before forming the protection layer OC. In areas (for example, second areas RG2 shown in FIG. 19) with the second auxiliary electrodes E2 disposed, perform a force touch detection by utilizing the second auxiliary electrodes E2; in areas (for example, first areas RG1 shown in FIG. 19) without the first auxiliary electrodes E1 and second auxiliary electrodes E2 disposed, at least a portion of the first pixel electrodes PE1 and/or the common electrodes COM may be configured or conducted to perform an ITPA touch detection. In other words, the liquid crystal display panel 201 may have a viewing angle control (VAC) function, an ITPA touch detection function, and a force touch detection function.

Figure 21:
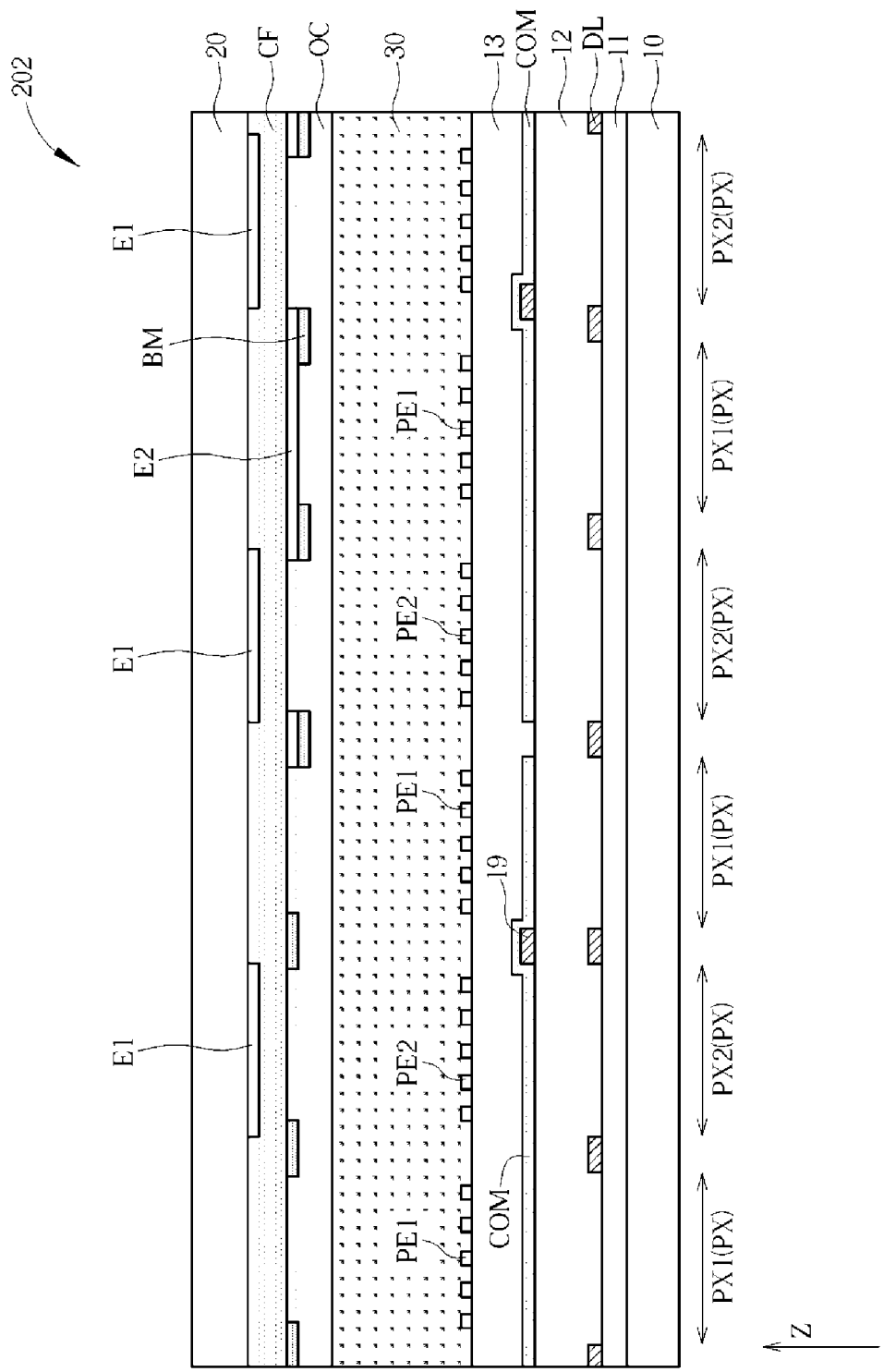
FIG. 21 is a schematic view of a liquid crystal display panel of a third embodiment of the present disclosure.

Please refer to FIG. 21. FIG. 21 is a schematic view of a liquid crystal display panel 202 of a third embodiment of the present disclosure. As shown in FIG. 21, the difference between the liquid crystal display panel of the second embodiment and the liquid crystal display panel 202 of the present embodiment is that, in the liquid crystal display panel 202 of the present embodiment, the second auxiliary electrodes E2 are at least partially disposed between the color filter layer CF and the patterned light-shielding layer BM. In other words, the second auxiliary electrodes E2 of the present embodiment may be formed on the color filter layer CF before forming the patterned light-shielding layer BM.

Figure 22:
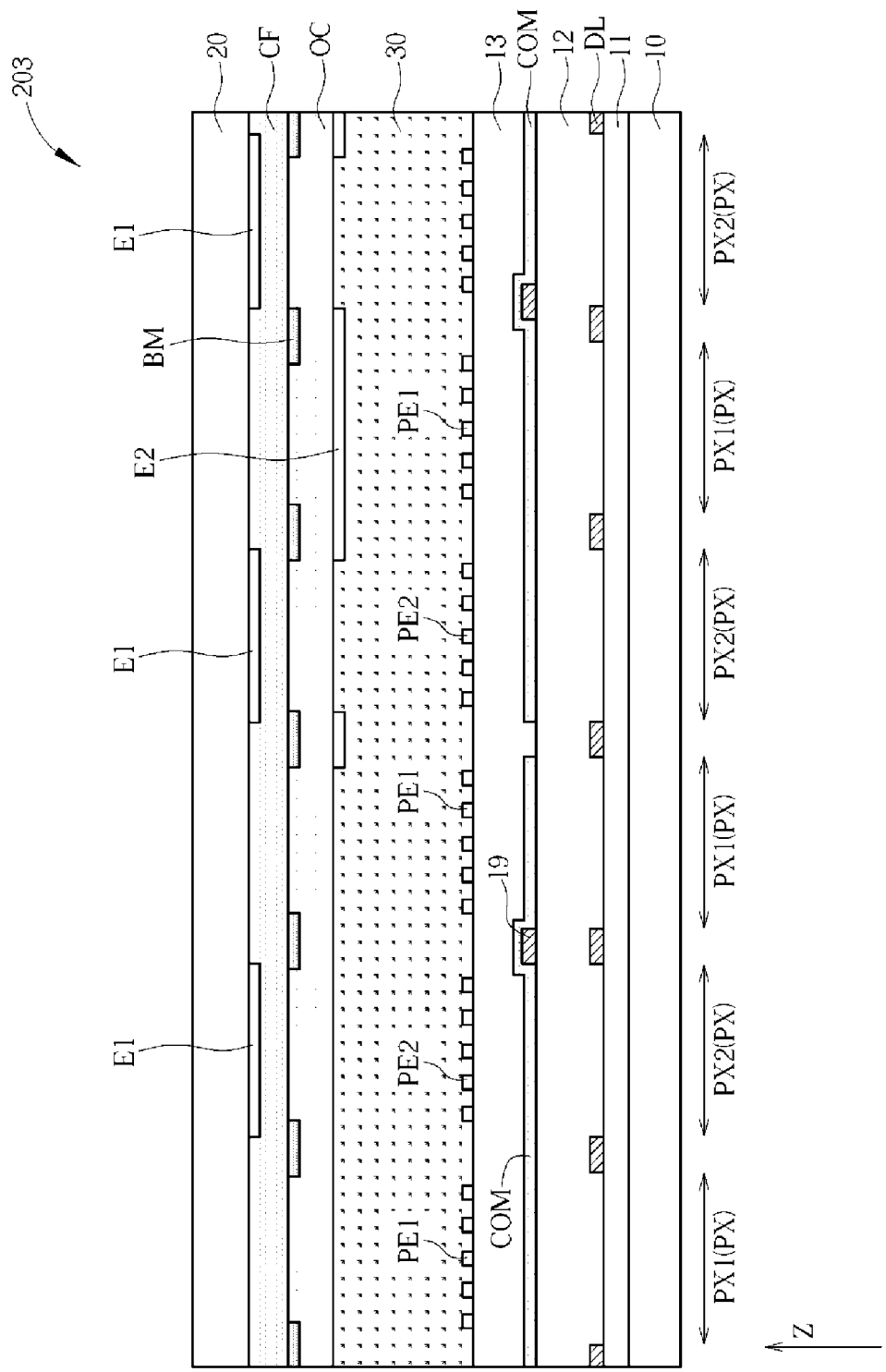
FIG. 22 is a schematic view of a liquid crystal display panel of a fourth embodiment of the present disclosure.

Please refer to FIG. 22. FIG. 22 is a schematic view of a liquid crystal display panel 203 of a fourth embodiment of the present disclosure. As shown in FIG. 22, the difference between the liquid crystal display panel of the second embodiment and the liquid crystal display panel 203 of the present embodiment is that, in the liquid crystal display panel 203 of the present embodiment, the second auxiliary electrodes E2 are at least partially disposed between the protection layer OC and the liquid crystal layer 30. In other words, the second auxiliary electrodes E2 of the present embodiment may be formed on the protection layer OC.

Figure 23:
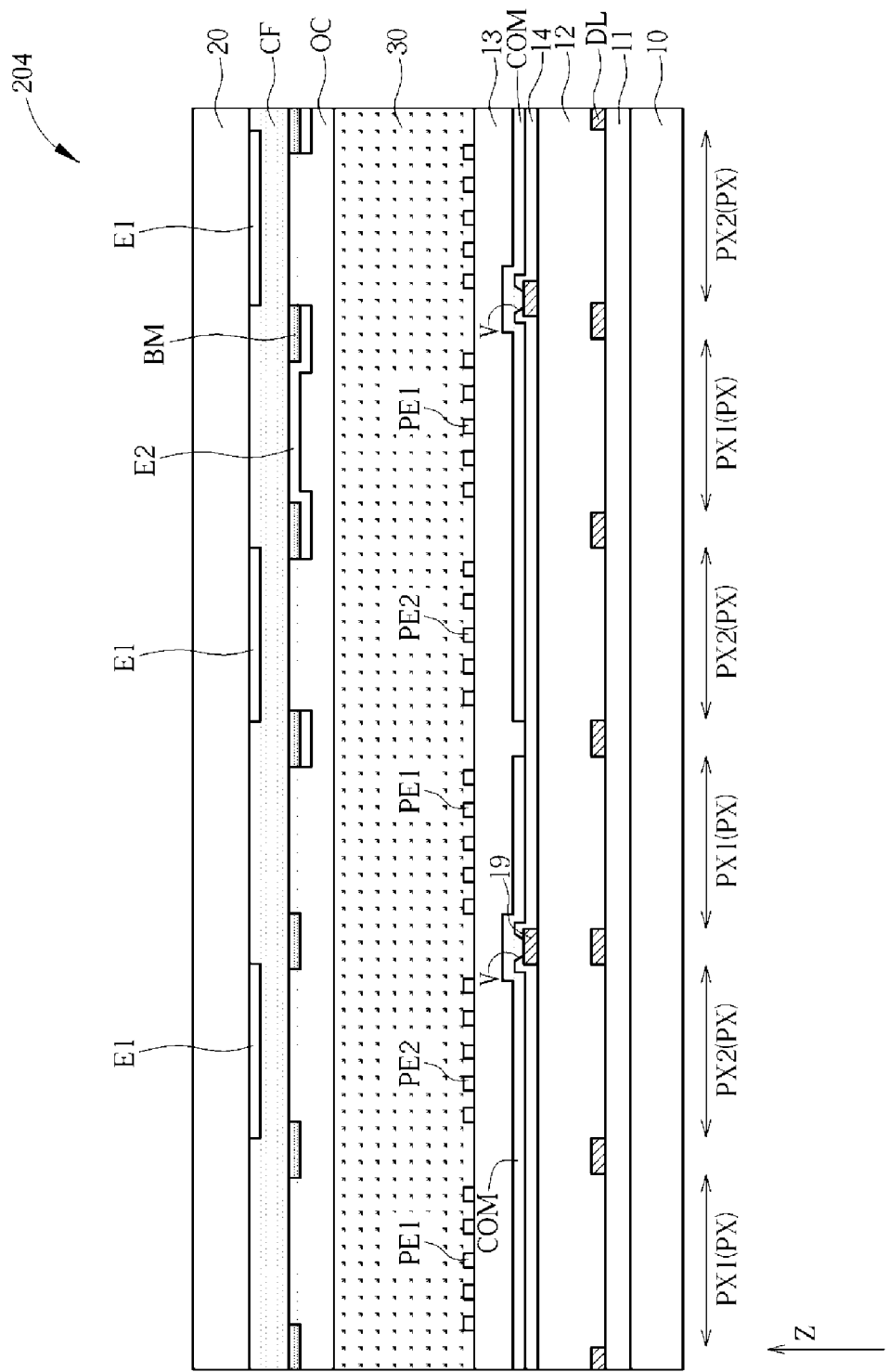
FIG. 23 is a schematic view of a liquid crystal display panel of a fifth embodiment of the present disclosure.
Figure 24:
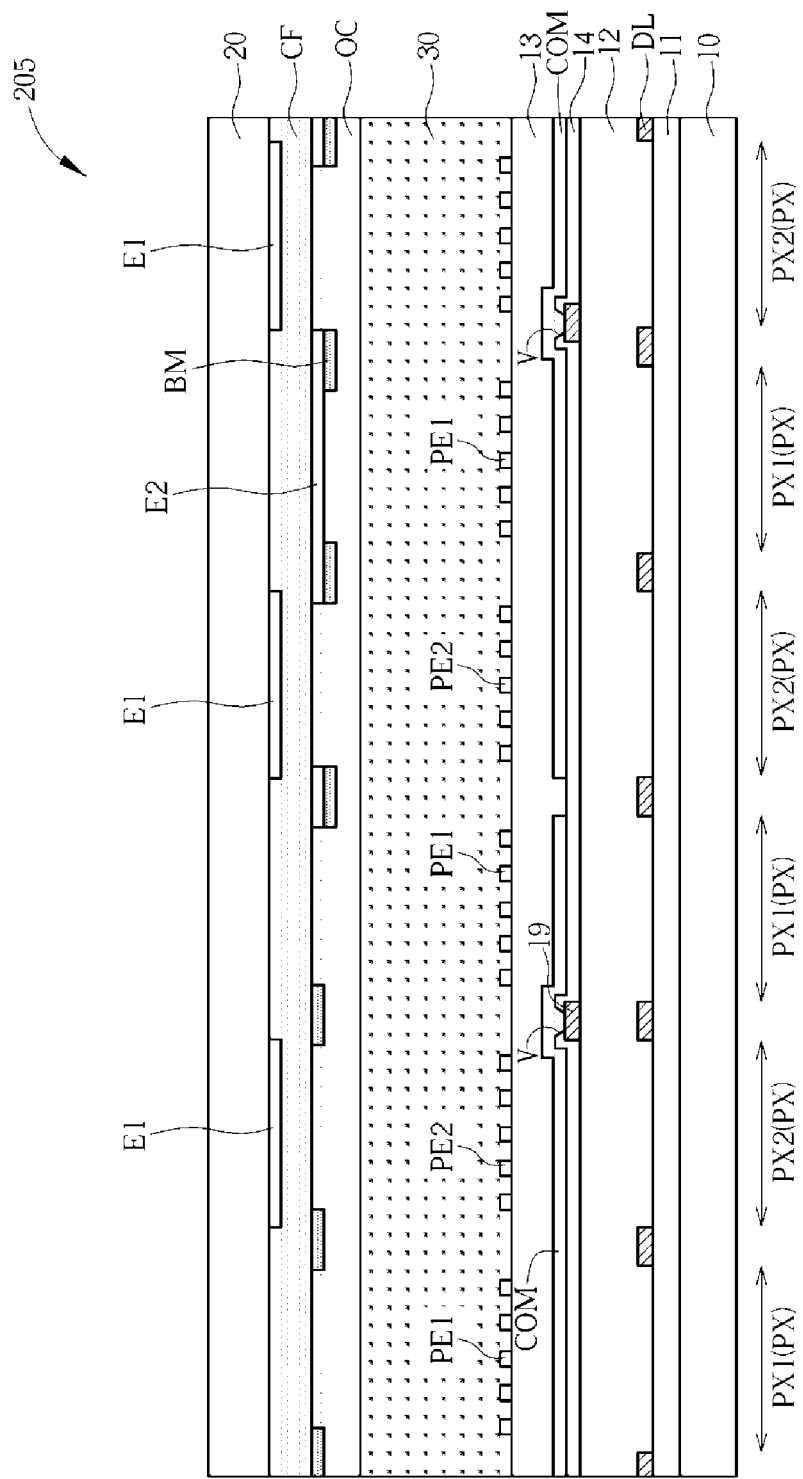
FIG. 24 is a schematic view of a liquid crystal display panel of a sixth embodiment of the present disclosure.
Figure 25:
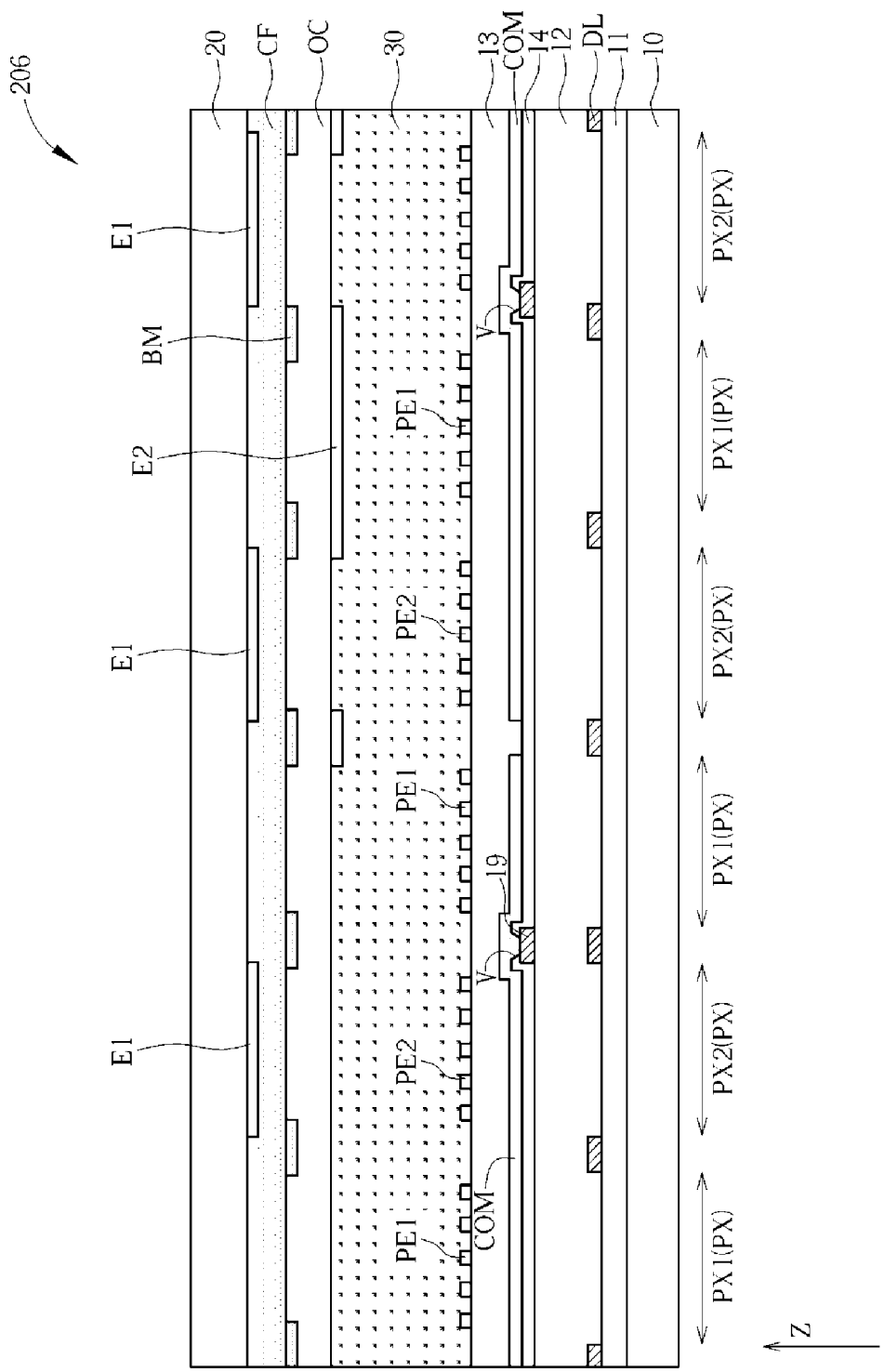
FIG. 25 is a schematic view of a liquid crystal display panel of a seventh embodiment of the present disclosure.

Please refer to FIG. 23 to FIG. 25. FIG. 23 is a schematic view of a liquid crystal display panel 204 of a fifth embodiment of the present disclosure. FIG. 24 is a schematic view of a liquid crystal display panel 205 of a sixth embodiment of the present disclosure. FIG. 25 is a schematic view of a liquid crystal display panel 206 of a seventh embodiment of the present disclosure. As shown in FIG. 23 to FIG. 25, the difference between the liquid crystal display panels of the second to fourth embodiments and the liquid crystal display panel 204, the liquid crystal display panel 205, and the liquid crystal display panel 206 is that, in the liquid crystal display panel 204, the liquid crystal display panel 205, and the liquid crystal display panel 206, a fourth dielectric layer 14 disposed on the second dielectric layer 12 is further comprised, and the common electrodes COM are disposed on the fourth dielectric layer 14. A contact through-hole V passes through the fourth dielectric layer 14 to expose at least a portion of the corresponding patterned metal layer 19, and the common electrode COM is electrically connected to the patterned metal layer 19 through the contact through-hole V.

To sum up, in the liquid crystal display panel of the present disclosure, since the first auxiliary electrodes are configured to not overlap with the first pixel electrodes, that is, the first auxiliary electrodes configured to achieve a narrow viewing angle display effect are not disposed in the entire pixel areas, a front-viewing-angle transmittance in the narrow viewing angle mode can thereby be increased, and on the other hand, since the first pixel electrodes and the common electrodes in the pixel areas without the first auxiliary electrodes being disposed are not covered by the first auxiliary electrodes, at least a portion of the first pixel electrodes and/or the common electrodes may be configured to perform touch detection. In addition, the second auxiliary electrodes overlapping the first pixel electrodes and electrically isolated from the first auxiliary electrodes may be disposed in the liquid crystal display panel and are configured to perform the force touch detection, such that the liquid crystal display panel of the present disclosure can have the viewing angle control (VAC) function, the ITPA touch detection function, and the force touch detection function.

The above description only provides preferred embodiments of the present disclosure, and all equivalent changes and modifications made according to the claims of the present disclosure fall within the scope of the present disclosure.

What is claimed is:
1. A liquid crystal display panel, comprising:
a first substrate;
a plurality of first pixel electrodes and a plurality of second pixel electrodes, disposed on the first substrate;
a plurality of common electrodes, disposed on the first substrate;
a second substrate, disposed opposite to the first substrate;
a plurality of first auxiliary electrodes, disposed on the second substrate, wherein one of the first pixel electrodes is not overlapping one of the first auxiliary electrodes in a vertical projection direction, and one of the second pixel electrodes overlaps one of the first auxiliary electrodes in the vertical projection direction;
a plurality of second auxiliary electrodes, disposed on the second substrate and electrically isolated from the first auxiliary electrodes, wherein the second auxiliary electrodes overlap the first pixel electrodes in the vertical projection direction respectively;
a liquid crystal layer, disposed between the first substrate and the second substrate; and
a color filter layer, disposed on the second substrate, wherein the first auxiliary electrodes are disposed between the color filter layer and the second substrate, and the second auxiliary electrodes are disposed between the color filter layer and the liquid crystal layer.

2. The liquid crystal display panel of claim 1, wherein the first pixel electrodes are arranged along a first direction to form a plurality of first pixel electrode sets, the second pixel electrodes are arranged along the first direction to form a plurality of second pixel electrode sets, and the first pixel electrode sets and the second pixel electrode sets are alternately arranged along a second direction.

3. The liquid crystal display panel of claim 1, wherein the first pixel electrodes and the second pixel electrodes are alternately arranged along a first direction and a second direction.

4. The liquid crystal display panel of claim 1, wherein a number of the first pixel electrodes is the same as a number of the second pixel electrodes.

5. The liquid crystal display panel of claim 4, wherein the first pixel electrodes correspond to a first color, a second color, and a third color, respectively, and the second pixel electrodes correspond to the first color, the second color, and the third color, respectively; and the number of the first pixel electrodes and the number of the second pixel electrodes corresponding to the same color are the same.

6. The liquid crystal display panel of claim 1, wherein a number of the first pixel electrodes is ⅓, ⅔, or ½ of a total number of the first pixel electrodes and the second pixel electrodes.

7. The liquid crystal display panel of claim 6, wherein the number of the first pixel electrodes is ⅓ of the total number of the first pixel electrodes and the second pixel electrodes, and one of the first pixel electrodes and two of the second pixel electrodes are sequentially arranged along a first direction to form a repeating unit, thereby forming a plurality of repeating units.

8. The liquid crystal display panel of claim 1, wherein the second pixel electrodes are not overlapping the second auxiliary electrodes in the vertical projection direction.

9. The liquid crystal display panel of claim 1, further comprising:
    a patterned light-shielding layer, disposed on the second substrate; and
    a protection layer, disposed on the second substrate and covering the first auxiliary electrodes, the color filter layer, and the patterned light-shielding layer.

10. The liquid crystal display panel of claim 9, wherein the second auxiliary electrodes are at least partially disposed between the protection layer and the liquid crystal layer.

11. The liquid crystal display panel of claim 9, wherein the second auxiliary electrodes are at least partially disposed between the color filter layer and the protection layer.

12. The liquid crystal display panel of claim 11, wherein the second auxiliary electrodes are further at least partially disposed between the color filter layer and the patterned light-shielding layer.

13. The liquid crystal display panel of claim 11, wherein the second auxiliary electrodes are further at least partially disposed between the patterned light-shielding layer and the protection layer.

14. A driving method of a liquid crystal display panel, comprising:
    providing the liquid crystal display panel of claim 1;
    in a wide viewing angle mode, providing a first voltage difference between the first auxiliary electrodes and the common electrodes; and
    in a narrow viewing angle mode, providing a second voltage difference between the first auxiliary electrodes and the common electrodes, wherein the first voltage difference is less than the second voltage difference.

15. The driving method of the liquid crystal display panel of claim 14, wherein the second pixel electrodes comprise a plurality of first polarity pixel electrodes and a plurality of second polarity pixel electrodes, a driving polarity of the first polarity pixel electrodes is opposite to a driving polarity of the second polarity pixel electrodes, each of the first auxiliary electrodes is disposed corresponding to one of the first polarity pixel electrodes or one of the second polarity pixel electrodes, and a number of the first polarity pixel electrodes is the same as a number of the second polarity pixel electrodes.

16. The driving method of the liquid crystal display panel of claim 14, wherein the first pixel electrodes comprise a plurality of third polarity pixel electrodes and a plurality of fourth polarity pixel electrodes, a driving polarity of the third polarity pixel electrode is opposite to a driving polarity of the fourth polarity pixel electrode, and a number of the third polarity pixel electrodes is the same as a number of the fourth polarity pixel electrodes.

17. The driving method of the liquid crystal display panel of claim 14, further comprising:
    performing a touch detection by utilizing at least a portion of at least one the first pixel electrodes and the common electrodes.

18. The driving method of the liquid crystal display panel of claim 14, further comprising:
    performing a force touch detection by utilizing the second auxiliary electrodes.

\* \* \* \* \*